(12) United States Patent
Ronen et al.

(10) Patent No.: US 12,152,994 B2
(45) Date of Patent: Nov. 26, 2024

(54) OPTICAL SAMPLE CHARACTERIZATION

(71) Applicant: Lumus Ltd., Ness Ziona (IL)

(72) Inventors: Eitan Ronen, Rechovot (IL); Eitan Baibich, Ness Ziona (IL); Elad Sharlin, Mishmar David (IL); Amir Shapira, Ness Ziona (IL); Jonathan Gelberg, Modiin (IL); Netanel Goldstein, Ness Ziona (IL); Elad Lavi, Ness Ziona (IL)

(73) Assignee: LUMUS LTD., Ness Ziona (IL)

( * ) Notice: Subject to any disclaimer, the term of this patent is extended or adjusted under 35 U.S.C. 154(b) by 310 days.

(21) Appl. No.: 17/791,923

(22) PCT Filed: Apr. 25, 2021

(86) PCT No.: PCT/IL2021/050473
§ 371 (c)(1),
(2) Date: Jul. 11, 2022

(87) PCT Pub. No.: WO2021/220267
PCT Pub. Date: Nov. 4, 2021

(65) Prior Publication Data
US 2023/0037873 A1 Feb. 9, 2023

Related U.S. Application Data

(60) Provisional application No. 63/017,673, filed on Apr. 30, 2020.

(51) Int. Cl.
*G01N 21/01* (2006.01)
*G01N 21/25* (2006.01)
(Continued)

(52) U.S. Cl.
CPC ......... *G01N 21/8422* (2013.01); *G01N 21/01* (2013.01); *G01N 21/55* (2013.01);
(Continued)

(58) Field of Classification Search
CPC ........ G01N 21/01; G01N 21/25; G01N 21/55; G01N 21/59; G01N 21/958;
(Continued)

(56) References Cited

U.S. PATENT DOCUMENTS 3,829,197 A 8/1974 Thelen
3,969,023 A 7/1976 Brandt et al.
(Continued)

FOREIGN PATENT DOCUMENTS

CN 202757593 U 2/2013
CN 103837988 6/2014
(Continued)

OTHER PUBLICATIONS

Jinying Li et al "Improvement of pointing accuracy for Risley prisms by parameter identification", Sep. 2017Applied Optics 56(26):7358, DOI:10.1364/AO.56.007358.
(Continued)

*Primary Examiner* — Uzma Alam
*Assistant Examiner* — Adrian Ignacio Silva
(74) *Attorney, Agent, or Firm* — Rivka Friedman

(57) ABSTRACT

Optical sample characterization facilitates measurement and testing at any angle in a full range of angles of light propagation through an optical sample, such as a coated glass plate, having a higher than air index of refraction. A rotatable assembly includes a cylinder having a hollow, and a receptacle including the hollow. The receptacle also contains a fluid with a known refractive index. An optical light beam is input normal to the surface of the cylinder, travels through the cylinder, then via the fluid, to the optical sample, where light beam is transmitted and/or reflected, then exits the cylinder and is collected for analysis. Due at least in part to the fluid surrounding the optical sample, the optical
(Continued)

sample can be rotated through a full range of angles (±90°, etc.) for full range testing of the optical sample.

20 Claims, 13 Drawing Sheets

(51) Int. Cl.
| | | |
|---|---|---|
| *G01N 21/55* | (2014.01) | |
| *G01N 21/59* | (2006.01) | |
| *G01N 21/84* | (2006.01) | |
| *G01N 21/958* | (2006.01) | |
| *G01N 21/95* | (2006.01) | |

(52) U.S. Cl.
CPC .......... *G01N 21/59* (2013.01); *G01N 21/958* (2013.01); *G01N 2021/558* (2013.01); *G01N 2021/8427* (2013.01); *G01N 2021/9511* (2013.01); *G01N 2021/9583* (2013.01)

(58) Field of Classification Search
CPC ......... G01N 21/8422; G01N 2021/558; G01N 2021/0342; G01N 2021/8427; G01N 2021/9511; G01N 2021/9583
See application file for complete search history.

(56) References Cited

U.S. PATENT DOCUMENTS

| | | | |
|---|---|---|---|
| 4,056,323 A | 11/1977 | Ludman | |
| 4,720,189 A | 1/1988 | Heynen et al. | |
| 5,208,800 A | 5/1993 | Isobe et al. | |
| 5,235,589 A | 8/1993 | Yokomori et al. | |
| 5,430,505 A | 7/1995 | Katz | |
| 5,712,694 A | 1/1998 | Taira et al. | |
| 5,930,046 A | 7/1999 | Solberg et al. | |
| 5,999,836 A | 12/1999 | Nelson | |
| 6,154,321 A | 11/2000 | Melville et al. | |
| 6,231,992 B1 | 5/2001 | Niebauer et al. | |
| 6,239,092 B1 | 5/2001 | Papasso et al. | |
| 6,239,771 B1 | 5/2001 | Usuki et al. | |
| 6,264,328 B1 | 7/2001 | Williams | |
| 6,268,884 B1 | 7/2001 | Yagi et al. | |
| 6,394,607 B1 | 5/2002 | Hashizume et al. | |
| 6,404,550 B1 | 6/2002 | Yajima | |
| 6,483,113 B1 | 11/2002 | Sealy et al. | |
| 6,542,307 B2 | 4/2003 | Gleckman et al. | |
| 6,671,100 B1 | 12/2003 | McRuer | |
| 6,829,095 B2 | 12/2004 | Amitai | |
| 6,879,443 B2 | 4/2005 | Spitzer et al. | |
| 6,927,694 B1 | 9/2005 | Smith et al. | |
| 7,420,691 B2 | 9/2008 | Fukui | |
| 7,612,879 B2 | 11/2009 | Stumpe et al. | |
| 7,808,625 B2 | 10/2010 | Nakamura et al. | |
| 7,869,128 B2 | 1/2011 | Yamaguchi et al. | |
| 7,949,252 B1 | 5/2011 | Georgiev | |
| 8,187,481 B1 | 5/2012 | Hobbs | |
| 8,472,119 B1 | 6/2013 | Kelly | |
| 8,665,178 B1 | 3/2014 | Wang | |
| 8,848,289 B2 | 9/2014 | Amirparviz | |
| 8,873,150 B2 | 10/2014 | Amitai | |
| 8,913,865 B1 | 12/2014 | Bennett | |
| 9,470,633 B2 | 10/2016 | Richards et al. | |
| 9,523,852 B1 | 12/2016 | Brown et al. | |
| 9,638,920 B2 | 5/2017 | Bohn | |
| 9,709,809 B2 | 7/2017 | Miyawaki et al. | |
| 9,738,041 B2 | 8/2017 | Tatsugi | |
| 9,798,061 B2 | 10/2017 | Hsiao et al. | |
| 10,078,222 B2 | 9/2018 | Komatsu et al. | |
| 10,175,141 B2 | 1/2019 | Franz | |
| 10,198,865 B2 | 2/2019 | Kezele et al. | |
| 10,222,535 B2 | 3/2019 | Remhof et al. | |
| 10,444,481 B2 | 10/2019 | Takahashi | |
| 10,564,417 B2 | 2/2020 | Danziger | |
| 10,564,430 B2 | 2/2020 | Amitai et al. | |
| 10,678,055 B2 | 6/2020 | Edwin et al. | |
| 10,969,590 B1 | 4/2021 | Danziger et al. | |
| 10,983,355 B2 | 4/2021 | Khan | |
| 11,009,737 B1 | 5/2021 | Matsuda et al. | |
| 11,016,302 B2 | 5/2021 | Freeman et al. | |
| 11,256,100 B2 | 2/2022 | Schultz et al. | |
| 11,409,103 B2 | 8/2022 | Danziger et al. | |
| 11,573,371 B2 | 2/2023 | Gilo et al. | |
| 11,662,311 B2 | 5/2023 | Aldaag et al. | |
| 2002/0080487 A1 | 6/2002 | Yajima | |
| 2002/0186179 A1* | 12/2002 | Knowles | G02B 27/0172 345/87 |
| 2003/0063293 A1 | 4/2003 | Kitabayashi et al. | |
| 2003/0165017 A1 | 9/2003 | Amitai | |
| 2003/0235768 A1 | 12/2003 | Fincher et al. | |
| 2004/0080718 A1 | 4/2004 | Kojima | |
| 2004/0150833 A1 | 8/2004 | Downs | |
| 2005/0024849 A1 | 2/2005 | Parker et al. | |
| 2005/0073577 A1 | 4/2005 | Sudo | |
| 2005/0225866 A1 | 10/2005 | Ageel | |
| 2005/0281515 A1 | 12/2005 | Togami | |
| 2006/0146518 A1 | 7/2006 | Dubin | |
| 2006/0153518 A1 | 7/2006 | AGeel et al. | |
| 2006/0221448 A1 | 10/2006 | NiVon et al. | |
| 2007/0052929 A1 | 3/2007 | Allman et al. | |
| 2007/0070859 A1 | 3/2007 | Hirayama | |
| 2007/0097356 A1* | 5/2007 | Stumpe | G01N 21/211 356/128 |
| 2007/0015967 A1 | 7/2007 | Freeman et al. | |
| 2007/0159673 A1 | 7/2007 | Freeman et al. | |
| 2007/0165192 A1 | 7/2007 | Prior | |
| 2007/0273611 A1 | 11/2007 | Torch | |
| 2008/0151375 A1 | 6/2008 | Lin | |
| 2008/0192239 A1 | 8/2008 | Otosaka | |
| 2008/0316606 A1 | 12/2008 | Inoguchi et al. | |
| 2009/0122414 A1 | 5/2009 | Amitai | |
| 2009/0147241 A1* | 6/2009 | Shlezinger | G01N 21/87 356/30 |
| 2009/0180194 A1 | 7/2009 | Yasushi et al. | |
| 2010/0188087 A1* | 7/2010 | Tammer | G01R 33/31 324/321 |
| 2010/0201953 A1 | 8/2010 | Freeman et al. | |
| 2010/0202048 A1 | 8/2010 | Amitai et al. | |
| 2010/0214635 A1 | 8/2010 | Sasaki et al. | |
| 2010/0214835 A1 | 8/2010 | Sasaki et al. | |
| 2010/0290124 A1 | 11/2010 | Tohara | |
| 2011/0050547 A1 | 3/2011 | Mukawa | |
| 2011/0050595 A1 | 3/2011 | Lunback et al. | |
| 2011/0096566 A1 | 4/2011 | Tsai et al. | |
| 2011/0109880 A1 | 5/2011 | Nummela | |
| 2011/0242661 A1 | 10/2011 | Simmonds | |
| 2011/0304828 A1 | 12/2011 | Khechana | |
| 2012/0062998 A1 | 3/2012 | Schultz | |
| 2012/0120498 A1 | 5/2012 | Harrison et al. | |
| 2012/0243002 A1 | 9/2012 | Yu | |
| 2012/0274751 A1* | 11/2012 | Smith | G01N 21/87 348/E5.029 |
| 2013/0022220 A1 | 1/2013 | Dong et al. | |
| 2013/0070344 A1 | 3/2013 | Takeda | |
| 2013/0077049 A1 | 3/2013 | Bohn | |
| 2013/0120224 A1 | 5/2013 | Cajigas et al. | |
| 2013/0135749 A1 | 5/2013 | Akutsu et al. | |
| 2013/0163089 A1 | 6/2013 | Bohn | |
| 2013/0187836 A1 | 7/2013 | Cheng | |
| 2013/0208362 A1 | 8/2013 | Bohn et al. | |
| 2013/0242392 A1 | 9/2013 | Amirparviz et al. | |
| 2014/0003762 A1 | 1/2014 | Macnamara | |
| 2014/0016051 A1 | 1/2014 | Kroll | |
| 2014/0104665 A1 | 4/2014 | Popovitch | |
| 2014/0014065 A1 | 5/2014 | Brown et al. | |
| 2014/0019801 A1 | 7/2014 | Lamb et al. | |
| 2014/0233015 A1* | 8/2014 | Mander | G01N 21/49 356/440 |
| 2015/0036141 A1* | 2/2015 | Adamovics | A61N 5/1071 356/432 |
| 2015/0070864 A1 | 3/2015 | Rainer et al. | |
| 2015/0138451 A1 | 5/2015 | Amitai | |
| 2015/0182348 A1 | 7/2015 | Siegal et al. | |
| 2015/0207990 A1 | 7/2015 | Ford | |

(56) References Cited

U.S. PATENT DOCUMENTS

| | | |
|---|---|---|
| 2015/0233824 A1 | 8/2015 | Richards |
| 2015/0243091 A1 | 8/2015 | Schowengerdt |
| 2015/0289762 A1 | 10/2015 | Popovich et al. |
| 2015/0331546 A1 | 11/2015 | Craven-Bartle et al. |
| 2015/0338655 A1 | 11/2015 | Sawada et al. |
| 2015/0035481 A1 | 12/2015 | Hikes et al. |
| 2015/0355481 A1 | 12/2015 | Hilkes |
| 2016/0012643 A1 | 1/2016 | Kezele et al. |
| 2016/0062119 A1 | 3/2016 | Fitch et al. |
| 2016/0062120 A1 | 3/2016 | Gupta et al. |
| 2016/0109712 A1 | 4/2016 | Harrison et al. |
| 2016/0116739 A1 | 4/2016 | Tekolste et al. |
| 2016/0161740 A1 | 6/2016 | Bar-Zeev et al. |
| 2016/0189432 A1 | 6/2016 | Bar-Zeev et al. |
| 2016/0020965 A1 | 7/2016 | Popovich et al. |
| 2016/0202048 A1 | 7/2016 | Meng |
| 2016/0207457 A1 | 7/2016 | Border et al. |
| 2016/0209648 A1 | 7/2016 | Haddick et al. |
| 2016/0266387 A1 | 9/2016 | TeKolste |
| 2016/0278695 A1 | 9/2016 | Wang et al. |
| 2016/0282616 A1 | 9/2016 | Matsushita |
| 2016/0314564 A1 | 10/2016 | Jones |
| 2017/0003504 A1 | 1/2017 | Vallius |
| 2017/0017095 A1 | 1/2017 | Fricker et al. |
| 2017/0122725 A1 | 5/2017 | Yeoh |
| 2017/0146802 A1 | 5/2017 | Pletenetskyy |
| 2017/0169747 A1 | 6/2017 | Richards et al. |
| 2017/0205277 A1 | 7/2017 | Ohtsuki |
| 2017/0227764 A1 | 8/2017 | Kim et al. |
| 2017/0276947 A1 | 9/2017 | Yokoyama |
| 2017/0307787 A1 | 10/2017 | Kawamura |
| 2017/0307896 A1 | 10/2017 | Kovaluk et al. |
| 2017/0353714 A1 | 12/2017 | Poulad et al. |
| 2017/0363799 A1 | 12/2017 | Ofir et al. |
| 2017/0363885 A1 | 12/2017 | Blum et al. |
| 2017/0371160 A1 | 12/2017 | Schultz |
| 2018/0003862 A1 | 1/2018 | Benitez |
| 2018/0052314 A1* | 2/2018 | Brinkman ............ G02B 21/22 |
| 2018/0101087 A1 | 4/2018 | Shinohara |
| 2018/0130391 A1 | 5/2018 | Bohn |
| 2018/0023177 A1 | 8/2018 | Schuck et al. |
| 2018/0275409 A1 | 9/2018 | Gao et al. |
| 2018/0284443 A1 | 10/2018 | Matsuki et al. |
| 2018/0284447 A1 | 10/2018 | Matsuki et al. |
| 2018/0284448 A1 | 10/2018 | Matsuki et al. |
| 2018/0033562 A1 | 11/2018 | Cheng et al. |
| 2018/0372940 A1 | 12/2018 | Ishii et al. |
| 2019/0064518 A1 | 2/2019 | Danziger |
| 2019/0068944 A1 | 2/2019 | Zhang et al. |
| 2019/0159354 A1 | 5/2019 | Zheng et al. |
| 2019/0168029 A1* | 6/2019 | Cachovan ............ A61N 5/1071 |
| 2019/0258054 A1 | 8/2019 | Yoon |
| 2020/0089001 A1 | 3/2020 | Amitai et al. |
| 2020/0183170 A1 | 6/2020 | Amitai et al. |
| 2020/0192089 A1 | 6/2020 | Haddick et al. |
| 2020/0278547 A1 | 9/2020 | Singer |
| 2020/0292818 A1 | 9/2020 | Amitai et al. |
| 2020/0292819 A1 | 9/2020 | Danziger et al. |
| 2021/0165231 A1 | 3/2021 | Gelberg et al. |
| 2021/0173480 A1 | 6/2021 | Osterhout |
| 2021/0190705 A1* | 6/2021 | May ............ G01N 23/083 |
| 2021/0239898 A1 | 8/2021 | Danziger et al. |
| 2021/0247608 A1 | 8/2021 | Eisenfeld et al. |
| 2021/0271006 A1 | 9/2021 | Ronen et al. |
| 2022/0004014 A1 | 1/2022 | Ronen et al. |
| 2022/0030205 A1 | 1/2022 | Danziger |
| 2022/0146839 A1 | 5/2022 | Miller |
| 2022/0397766 A1 | 12/2022 | Chriki et al. |
| 2022/0412877 A1* | 12/2022 | Wuu ............ G02B 6/06 |

FOREIGN PATENT DOCUMENTS

| | | |
|---|---|---|
| CN | 104536138 A | 4/2015 |
| CN | 106054292 | 10/2016 |
| CN | 106403830 A | 2/2017 |
| CN | 207216158 U | 4/2018 |
| CN | 110207587 A | 9/2019 |
| CN | 110542541 A | 12/2019 |
| DE | 202013003898 U | 7/2014 |
| JP | H02182447 A | 7/1990 |
| JP | 1996313843 | 11/1996 |
| JP | 09258062 | 10/1997 |
| JP | H09304036 | 11/1997 |
| JP | H09304036 A | 11/1997 |
| JP | 2001021448 A | 7/1999 |
| JP | 2001021448 | 1/2001 |
| JP | 2003065739 | 3/2003 |
| JP | 2003232623 | 8/2003 |
| JP | 2008035146 | 2/2008 |
| JP | 2010014705 | 1/2010 |
| JP | 2010044172 | 2/2010 |
| JP | 2012-037761 U | 2/2012 |
| JP | 5010964 | 8/2012 |
| JP | 2013231652 | 11/2013 |
| JP | 2014215141 | 11/2014 |
| JP | 2017146494 A | 8/2017 |
| JP | 2017197434 A | 12/2017 |
| WO | 02099359 | 12/2002 |
| WO | 2006098097 A1 | 9/2006 |
| WO | 2013049248 A2 | 4/2013 |
| WO | 2015192117 | 12/2015 |
| WO | 2016/133886 | 2/2016 |
| WO | WO2015012280 | 3/2017 |
| WO | 2018/013307 | 1/2018 |
| WO | 2019131277 | 7/2019 |
| WO | 2021-055278 | 3/2021 |
| WO | 2021260708 | 2/2022 |
| WO | 2022107140 | 5/2022 |

OTHER PUBLICATIONS

Klaus Ehrmann et al "Optical power mapping using paraxial laser scanning",Proceedings vol. 7163, Ophthalmic Technologies XIX; 71631E (2009) https://doi.org/10.1117/12.806765 Event: SPIE BiOS, 2009, San Jose, California, United States.
Erhui Qi et al "The Application of Pentaprism Scanning Technology on the Manufacturing of M3MP",Proc. of SPIE vol. 9682 96821A-1 Downloaded From: http://proceedings.spiedigitallibrary.org/ on Dec. 8, 2016 Terms of Use: http://spiedigitallibrary.org/ss/termsofuse.aspx.
Wei Chen et al"An Image Quality Evaluation Method of near-eye display" , First published: May 25, 2016 https://doi.org/10.1002/sdtp.10935.
Jaramillo-Nunez A et al, "Measuring the Angles and Pyramidal Error of High-Precision Prisms", Optical Engineering, Soc. of Photo-Optical Instrumentation Engineers, Bellingham, (Oct. 1, 1997), vol. 36, No. 10, doi: 10.1117/1.601516, ISSN 0091-3286, pp. 2868-2871, XP000729477 [A] 1-15 * the whole document * DOI: http://dx.doi.org/10.1117/1.601516.
Jinying Li et al "Improvement of pointing accuracy for Risley prisms by parameter identification" in Applied Optics vol. 56 Issue: 26 pp. 7358-7366 DOI: 10.1364/AO.56.007358 Published: Sep. 10, 2017.
International Preliminary report on patentability (IPRP) May 16, 2023.
Mukawa et al.;A full-color eyewear display using planar waveguides with reflection volume holograms. Journal of The Society for Information Display—J Soc Inf Disp. Mar. 17, 2009. 10.1889/JSID17.3.185-187 Mar. 31, 2009 (Mar. 31, 2009) pp. 285-287.
International Commission on Non-Ionizing Radiation Protection "ICNIRP Guidelines for Limiting Exposure to Time-Varying Electric, Magnetic and Electromagnetic Fields (Up to 300 GHZ)" Published In: Health Physics 74 (4):494-522; 1998.
Jan van de Kraats et al. "Directional and nondirectional spectral reflection from the human fovea" journal of biomedical optics 13(2), 024010 Mar./ Apr. 2008.
Petros L.Stavroulakis et al : "Suppression iof backsacattered diffraction from sub-wavelength 'moth-eye arrays'"; published in Optics Express Jan. 2013.

(56) References Cited

OTHER PUBLICATIONS

International Commission on Non-Ionizing Iradiation Protection : "NCIRP Guidelines for limiting Exposure to Time-Varying Electric, Magnetic and Electromagnetic Fields"; Published in Health Physics , Apr. 1998 vol. 74 No. 4.

R.J Wiblein et al ;"Optimized Anti- Reflective structures for $As\_2s\_3$ Chalcogenide Optical Fibers", published in Optics Express , May 2, 2016 vol. 24 No. 9.

O.Yang et al;"Antireflection Effects at NanoStructures Materials Interfaces and teh Suppression of Thin-Film Intereference";published in Nanotechnology 24 (2013).

\* cited by examiner

OPTICAL SAMPLE CHARACTERIZATION

FIELD OF THE INVENTION

The present invention generally relates to optical testing, and in particular, it concerns full range testing of coatings.

BACKGROUND OF THE INVENTION

Current techniques for measuring optics, in particular coatings, are limited to a small range of angles, or a small set of discrete angles, and/or have significant problems due to refraction. Generally, there is a lack of consistency and/or accuracy in the results of measuring.

SUMMARY

Optical sample characterization facilitates measurement and testing at any angle in a full range of angles of light propagation through an optical sample, such as a coated glass plate, having a higher than air index of refraction. A rotatable assembly includes a cylinder having a hollow, and a receptacle including the hollow. The receptacle also contains a fluid that in some implementations has a refractive index matching the refractive index of the optical sample and/or the cylinder. An optical light beam is input normal to the surface of the cylinder, travels through the cylinder, then via the fluid, to the optical sample, where light beam is transmitted and/or reflected, then exits the cylinder and is collected for analysis. Due at least in part to the fluid surrounding the optical sample, the optical sample can be rotated through a full range of angles (±90°, etc.) for full range testing of the optical sample.

According to the teachings of the present embodiment there is provided an apparatus for optical testing of a sample of optical material, the apparatus including: a rotatable assembly including: an optically transparent general-cylinder having a central hollow on an axis of the general-cylinder, the hollow sized to receive at least a core area of the sample of optical material, a receptacle including the hollow, the receptacle sized to receive at least a portion of the sample of optical material, and the receptacle sealed for receiving a quantity of fluid, such that the fluid surrounds and is in contact with at least the core area, and is in contact with the general-cylinder, a turntable aligned with the axis and operable to rotate the rotatable assembly around a height-axis of the general-cylinder, and an optical arrangement: aligned with the axis, including an optical source providing an optical light beam normal to a surface area at a first side of the general-cylinder, and including an optical detector accepting an output signal, the output signal including reflection of the optical light beam from the surface area, the optical detector normal to a surface area at the first side of the general-cylinder.

According to the teachings of the present embodiment there is provided an apparatus for optical testing of a sample of optical material, the apparatus including: an assembly including: an optically transparent general-cylinder having an interior partially filled with a bulk material portion from an interior surface of the general-cylinder toward a center axis of the general-cylinder, and the interior having a hollow portion extending from an opposite interior surface of the general cylinder and including the axis, the hollow sized to receive at least a core area of the sample of optical material, a receptacle including the hollow, the receptacle sized to receive at least a portion of the sample of optical material, and the receptacle sealed for receiving a quantity of fluid, such that the fluid surrounds and is in contact with at least the core area, and is in contact with the general-cylinder and at least a portion of the bulk, and an optical arrangement: aligned with the axis, including an optical source providing an optical light beam normal to a surface area at a first side of the general-cylinder, and including an optical detector accepting an output signal, the output signal from the optical light beam impinging on the core area, the optical detector normal to a surface area of the general-cylinder.

In an optional embodiment, the assembly is a rotatable assembly, and further including: a turntable aligned with the axis and operable to rotate the rotatable assembly around a height-axis of the general-cylinder.

In another optional embodiment, the bulk fills substantially a semicircular half of the receptacle.

In another optional embodiment, the bulk material is a same optically transparent material as the general-cylinder optically transparent material.

In another optional embodiment, further including: a mounting arrangement for receiving the optical arrangement and adjustable for aligning the optical source and the optical detector.

In another optional embodiment, 2 further including a clamping mechanism securing location of the sample with respect to the receptacle.

In another optional embodiment, further including a motor operationally connected to the rotatable assembly and operable to rotate the rotatable assembly, and an encoder operationally connected to the rotatable assembly and operable to provide position information at least regarding angle of rotation of the rotatable assembly.

In another optional embodiment, wherein the general-cylinder is selected from the group consisting of: a cylinder, and a prism. In another optional embodiment, wherein indexes of refraction of the general-cylinder, the sample, and the fluid are substantially equal. In another optional embodiment, wherein the fluid is an index matching fluid, and indexes of refraction of the sample and the fluid are substantially equal. In another optional embodiment, wherein the general-cylinder and the sample of an optical material are made of the same optically transparent, solid material.

In another optional embodiment, wherein the general-cylinder is substantially symmetric parallel to the height-axis of the general-cylinder. In another optional embodiment, wherein the general-cylinder is positioned according to the group consisting of: stationary, rotatable in a single axis, rotatable in more than one axis, rotatable in a predefined range of angles, and rotatable ±90 degrees from a normal to the sample.

In another optional embodiment, wherein the core area of the sample is a location of the sample where a light beam encounters the sample and testing of the sample is performed.

In another optional embodiment, wherein the receptacle has: a receptacle-width in a direction along a cylinder diameter of the general-cylinder, the receptacle-width being smaller than the cylinder diameter, and a receptacle-thickness non-parallel to the receptacle-width, the receptacle-thickness between a first side and second side of the general-cylinder, and the sample has: a plate-width in a direction along the cylinder diameter, the receptacle-width being greater than the plate-width, and a plate-thickness non-parallel to the plate-width, the receptacle-thickness being greater than the plate-thickness.

In another optional embodiment, the receptacle-width and the plate-width are aligned substantially parallel. In another optional embodiment, the receptacle is configured to contain 0.5 cubic centimeters (cc) to 50 cc of fluid.

In another optional embodiment, the sample is selected from the group consisting of: a glass plate, a coated glass plate, a thin film polarizer, a glass polarizer, a plastic polarizer, a beam splitter, a wave plate, a lightguide optical elements (LOE), a structured optical element selected from the group consisting of: a ruled grating, a holographic grating, a holographic volume grating, diffraction optical elements, Fresnel lenses, sub-wavelength photonic structures, and a wire grid.

In another optional embodiment, the optical element is coated with a coating, the coating used to manipulate light incident to the sample.

In another optional embodiment, the optical arrangement includes collimating optics preparing the optical light beam and inputting the optical light beam into the general-cylinder, the collimating optics adjustable with at least two degrees of freedom. In another optional embodiment, an optical path of the optical light beam is through the general-cylinder and the fluid, and a majority of the optical path is through the general-cylinder.

In an optional embodiment, there is provided a controller operationally connected to the apparatus of claim 1 or claim 3, the controller configured to initiate inputting an optical light beam normal to a surface area of a first side of the general-cylinder; position the general-cylinder so a light beam path traverses via a first side of the general-cylinder until reaching the hollow, then traverses from the first side into the fluid in the hollow on a first side of the sample, through the sample, through the fluid on an other side of the sample, into a second side of the general-cylinder, traverses the second side and exits normal to a surface area of the second side of the general-cylinder as an output signal; and activate capturing the output signal by the optical detector. In another optional embodiment, the controller is further configured to: after positioning the general-cylinder at a first angle of the sample relative to the light beam path, rotate the general-cylinder such that the sample is at a second angle relative to the light beam path, and repeat the capturing and the rotating.

According to the teachings of the present embodiment there is provided a method for optical testing of a sample of optical material, the method including the steps of: providing the apparatus, inputting an optical light beam normal to a surface area of a first side of the general-cylinder; positioning the general-cylinder so a light beam path traverses via a first side of the general-cylinder until reaching the hollow, then traverses from the first side into the fluid in the hollow on a first side of the sample, through the sample, through the fluid on an other side of the sample, into a second side of the general-cylinder, traverses the second side and exits normal to a surface area of the second side of the general-cylinder as an output signal; and capturing the output signal by the optical detector.

In another optional embodiment, further including the steps of: after the positioning at a first angle of the sample relative to the light beam path, rotating the general-cylinder such that the sample is at a second angle relative to the light beam path, and repeating the capturing and the rotating. In another optional embodiment, further including the step of: processing data collected by the capturing to calculate results of the optical testing.

BRIEF DESCRIPTION OF FIGURES

The embodiment is herein described, by way of example only, with reference to the accompanying drawings, wherein.

DETAILED DESCRIPTION

Apparatus—FIGS. 1A to 4

Figure 1A:
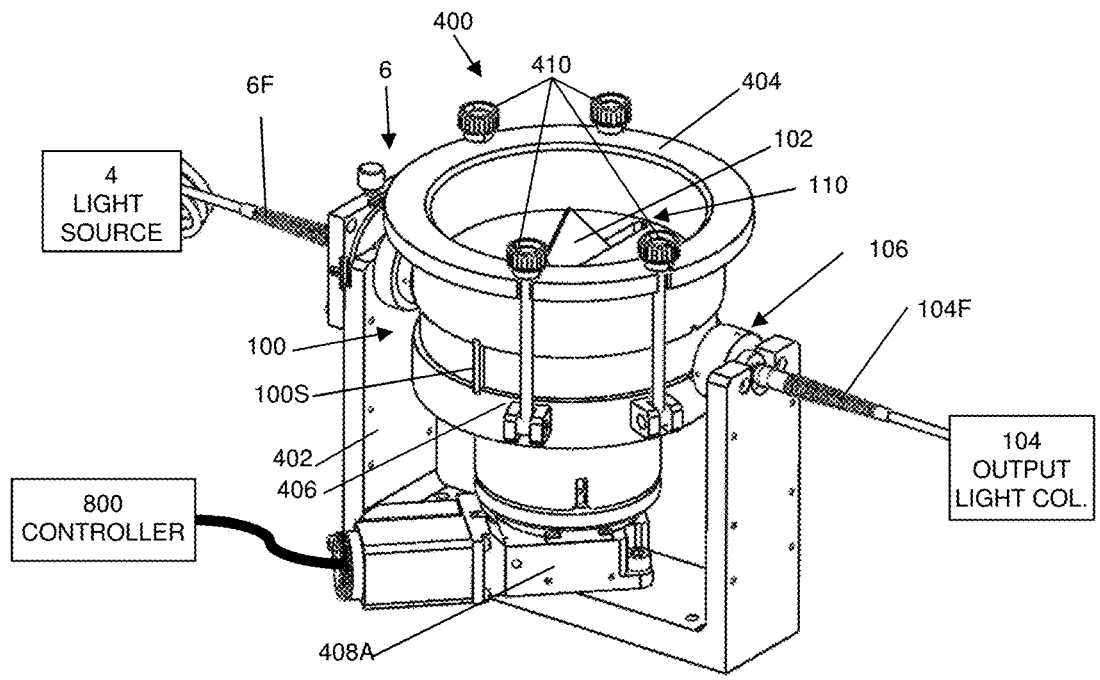
FIG. 1A is a sketch of an apparatus for full-range optical sample characterization (testing).

The principles and operation of the apparatus and method according to a present embodiment may be better understood with reference to the drawings and the accompanying description. A present invention is an apparatus and method for optical sample characterization. The invention facilitates measurement and testing of a full range of angles of light propagation through an optical sample, such as a coated glass plate, having a higher than air index of refraction.

In general, an innovative rotatable assembly includes a glass cylinder having a hollow. The hollow is a portion of a receptacle in the rotatable assembly. The receptacle is sized for variable-size coated glass plates. The receptacle is also sealed for receiving a quantity of fluid with a certain, given, refractive index. A light beam propagates from a test source via collimating optics, entering normal (90 degrees) to the surface of the cylinder, through the cylinder, then via the fluid through the coating, the (coated) glass plate, the fluid, the other side of the cylinder, and is collected for analysis. Due at least in part to the fluid surrounding the coated plate, the plate can be rotated through a full range of angles (±90°, etc.) for any particular angle in the full range testing of the coating. Preferably, the cylinder and the plate are made of the same material, thus having matching indexes of refraction. An exemplary typical material is BK7 glass, however, this example is not limiting, and other glasses and other materials besides glass can be tested. This apparatus and method can also be used to measure directly the reflectance of the coated plate.

Current devices and methods are not adequate for characterizing the current and foreseen coatings over a full range of incident angles in glass. Conventional techniques are inadequate for meeting existing requirements. A technique is required to implement maximal, preferably full range angular measurement of coatings. In the context of this document, the term "full range" generally refers to a range of 180°, or ±90°, with respect to normal to the coated plate being tested. The full range may be other than ±90° for specific implementations. In contrast, conventional measurement techniques typically measure a range of discrete angles only in air. For example, 70° transmission in air and 45° reflection in air with optional specialized modules added to standard single or double beam spectrophotometers. For measurement in glass, the conventional method is to assemble the coating in a prism assembly and then measure the performance in a range of up to ±5°. The measurement angle is restricted to the angle of the prisms in the assembly (±5°).

Snell's law, regarding total internal reflection (TIR) and dependency of the path of light travelling through the materials, limits the angle of incidence of the plate being measured. For example, consider a ray of light moving from an example glass to air. The critical angle $\theta_{cr}$ is the value of incident angle in the glass, $\theta_1$, for which the exit angle in air, $\theta_2$, equals 90°, i.e. the refractive indices of example glass $n_1$ and air $n_2$, are respectively approximately 1.52 and 1 giving the value of ~41°, using Snell's law for light traversing from one optical medium to another. Therefore, a measurement in air cannot replicate measurement of angles above ~41° in glass.

For simplicity in this description, the term "coated plate" may also be referred to as a "plate" or "coating", as will be obvious from context. Current typical plate sizes include 70×70 mm (millimeters) and 60×30 mm. In the context of this document, the term "coated plate" generally refers to a plate having an optical coating on a surface of the plate. Coatings are typically multilayer thin films. A coated glass plate is generally used in this description, but is not limiting, and other samples, of other materials and shapes may be used. In general, the plate can be an arbitrary, non-air, shape which allows free, non-scattering, optical path between the light source and the light detector. The testing apparatus may measure any sample of an optical material (sample, optical element), such as thin film, glass, or plastic polarizers, wave plates, beam splitters, dichroic reflectors, Lightguide Optical Elements (LOEs), a structured optical element like a grating or wire grid, and more. Optical filters (coatings) are used to manipulate incident light (incident to the coated plate) to designated reflectance, transmittance, absorption, polarization, etc. To test (probe and measure) the coating and/or compare the actual performance of the coating versus the designated required performance of the coating, optical measurement is used.

Similarly, for simplicity in this description, the term "glass cylinder" is used, but is not limiting. For example, the materials of the cylinder (cylinder, cylinder ring, sphere, bulk, half bulk, etc.) can also be a polymer (one non-limiting example is an optical non-birefringent polymer).

Embodiments of the apparatus and method of the current description can be used for characterization, measurement, and testing. The apparatus can be implemented for a variety of functions, including acceptance measurements for coating devices and processes (coating materials such as glass plates). For simplicity in this document, the term "testing" is used, but should not be considered limiting.

Figure 1B:
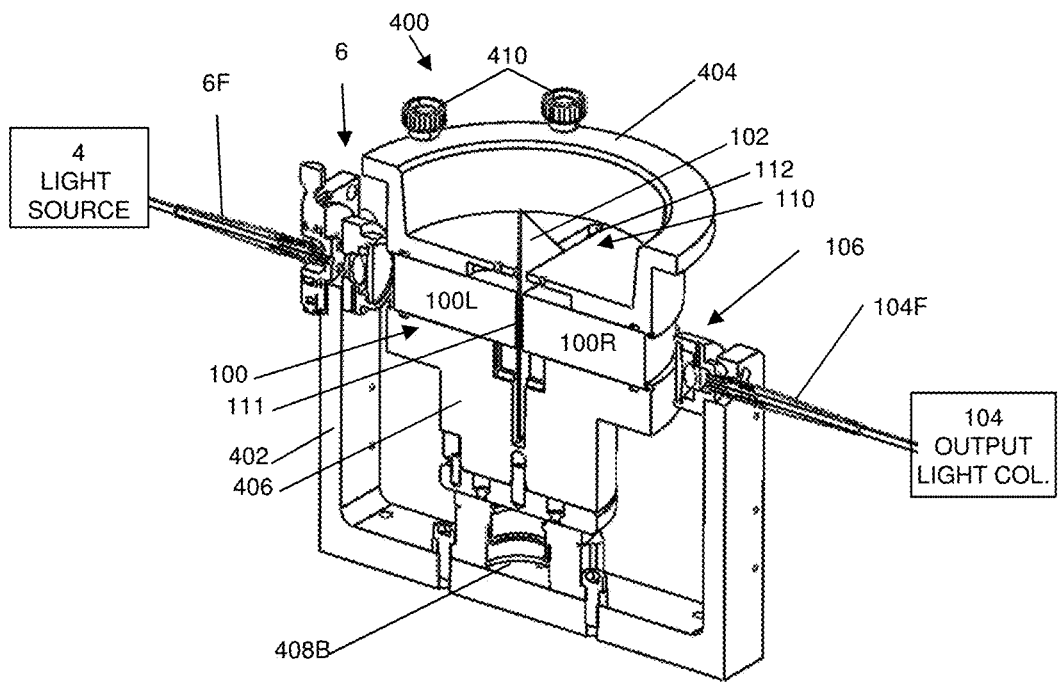
FIG. 1B is a sketch of a sectional view of the apparatus.

Referring now to the drawings FIG. 1A, is a sketch of an apparatus for full-range optical sample characterization (testing) and FIG. 1B is a sketch of a sectional view of the apparatus. The testing apparatus 400 is generally referred to in the context of this document as a "jig". The testing apparatus 400 holds the plate being tested, support structure, and guides the elements, providing repeatability, accuracy, and interchangeability in the testing. The testing apparatus 400 includes a base 402 to which various other elements are mounted. The exemplary optical material being tested is a coated plate 102 seated in a receptacle 110 in a rotatable assembly. The rotatable assembly includes a cylinder 100 and a turntable. The cylinder 100 includes a hollow 111. The turntable can be implemented by the bottom portion 406 having a motor attachment area 408B with a motor 408A connected. The receptacle 110 is filled with a fluid 112, in some implementations being a refractive index matching fluid. Position pins 410 can be used to clamp the cylinder 100 between a top portion 404 and a bottom portion 406. An exemplary side containment for fluid 112 is shown as rib 100S. An input test light source 4 provides an optical input signal via optional input cable 6F to collimating optics 6. The collimating optics 6 prepares the input signal for input into rotatable cylinder 100. The prepared light beam provides parallel illumination for testing. Output optics 106 feed an optional output cable 104F to an output light collector (light detector) 104.

For convenience of reference, the rotatable cylinder 100 is referred to in the context of this document as the cylinder 100. The rotatable cylinder 100 is typically a solid material, an optical material, transparent to an optical light beam. The rotatable cylinder 100 interior is substantially filled with a solid material, at least a majority of the interior filled with a solid material other than the fluid 112. The shape of the cylinder 100 can be, in general, what is known by some authors in the field of mathematics as a "general-cylinder". A general-cylinder is defined as a category of solids which include prisms as a form of cylinder. As the receptacle 110 can be formed within both cylinders and prisms, we use the term "general-cylinder" to include embodiments using either a cylinder or prism. Thus, the rotatable cylinder 100 can have the shape of a cylinder or polygonal prism. For example, the round surface of a cylinder allows any angle of rotation to be used for the cylinder (and hence for measuring the coated plate 102) while maintaining the optical input and output substantially normal to the surface of the cylinder 100. If one were to only need, for example, 5 or 10 discrete measurements, a 10 or 20-sided a polygonal circumference can be used and the motor confined to step by 18 or 9 degrees. Even more generally, the shape of the cylinder 100 can be an arbitrary, non-air, shape which allows free, non-scattering, optical path from the optical light source 4 to the optical detector 104. Based on this description, one skilled in the art will be able to design the other apparatus and system components accordingly.

The cylinder 100 can be stationary, rotate in a single axis, or rotate in one or more axes to move the plate 102 for testing of various incident angles and areas of the plate. The current description and figures are only of the cylinder 100 being rotated around a fixed axis (the height-axis of the cylinder). Based on this description, one skilled in the art will be able to design and implement one of more directions of movement and testing of the plate 102.

For convenience of reference, the input signal is shown entering the cylinder 100 from a left side of the figures and the corresponding labeled first side is a left side of the cylinder 100L. A labeled second side is a right side of the cylinder 100R adjacent to output optics 106 that feed an optional output cable 104F to an output light collector 104. It will be obvious to one skilled in the art that the cylinder 100 is generally substantially symmetric. The cylinder 100 can be rotated horizontally, and the left side 100L and right side 100R of the cylinder can be interchanged. In a non-limiting example, the cylinder 100 can be implemented as a single piece (of glass), with a hollow 111 in the middle for the receptacle 110. In this case, the left side of the cylinder 100L and the right side of the cylinder 100R are opposite sides of the same piece. The hollow 111 may extend the entire height of the cylinder (top to bottom), or be partial, for example, forming a pocket in the cylinder. In another non-limiting example, the cylinder 100 can be created from two pieces, a first piece being the first, left side of the cylinder 100L and a second piece being the second, right side of the cylinder 100R.

The collimating optics 6 and the output optics 106 are preferably adjustable with at least two degrees of freedom to allow adjustment of the light beam, initial, and subsequent calibration. For example, the collimating optics 6 and the output optics 106 may be adjusted ±0.5 mm along the x-axis and y-axis of the light beam path.

In some implementations, the fluid 112 is an index matching fluid. For convenience of reference, refractive index matching fluid 112 is referred to in the context of this document as "fluid 112". In some implementations, the fluid 112 has a refractive index matching the refraction index of (the material/glass of) the cylinder 100. In some implementations, the fluid 112 has a refractive index matching the refraction index of the plate 102. In some implementations, the cylinder 100 and the plate 102 are made of the same material (so the respective indices of refraction match). Similarly, one or more of the refractive indexes of the fluid 112, the plate 102, and the cylinder 100 can differ from each other. Regarding specific matching of indexes and ranges of difference between element's refractive indexes, one skilled in the art will be aware of the allowable tolerances.

The input cable 6F and the output cable 104F are typically optical fibers, but can be any suitable transmission medium depending on the specifics of the implementation.

The testing apparatus 400 typically includes the top portion 404 and the bottom portion 406 for supporting and mounting various cylinders 100. Position pins 410 can be used to attach the top portion 404 to the bottom portion 406, clamping the cylinder 100 between the top and bottom portions, facilitating alternative cylinders 100, top 404, and bottom 406 portions being used. For example, the top portion 404 can be changed to a second top portion including a different size and/or configuration of receptacle to test a different plate. Or for example, a cylinder composed of a first material having a first index of refraction for testing a plate having a first index of refraction can be replaced with a cylinder composed of a second material having a second index of refraction for testing a plate having a second index of refraction. In another example, the cylinder, top, and bottom portions are all replaced with alternative elements having (creating) a wider/thicker receptacle for testing a thicker plate, or for creating a different shaped receptacle for testing a different shape of optical sample, for example round.

The cylinder 100 can be rotated by a variety of means. In the current figures, exemplary motor attachment area 408B is provided at the bottom of the bottom portion 406, and also shown with a motor 408A connected. The motor 408A, in this case in a typical combination with the bottom portion 406, functions as a general turntable for rotating the cylinder 100 around a height-axis of the cylinder 100. The cylinder 100 and turntable form the rotatable assembly. Rotating the rotatable assembly rotates the cylinder 100, thereby rotating the receptacle 110 and sample (coated plate 102). A controller 800 is operationally connected to the motor 408A in the current figure, and for clarity is not shown in all figures. Not shown in the figures is an encoder operationally connected to the rotatable assembly. The encoder provides position information at least regarding angle of rotation of the rotatable assembly so the position of the coated plate 102 is known with respect to an axis of the cylinder 100 and to angle with regard to a normal to the coated plate 102 (the optical sample being tested). As is known in the art, the position encoder may be part of the motor 408A or a separate component.

For reflectance measurements, the output optics 106 are typically placed at a different angle than shown in the drawings, to collect a beam reflected from the plate 102 under test.

The base 402 provides a mounting arrangement for various jig components, depending on specific testing configurations, such as the motor 408A, motor attachment area 408B, bottom portion 406, and for receiving, adjusting and aligning the optical arrangement (optical test light source 4, input cable 6F, collimating optics 6, output optics 106, output cable 104F, and output light collector 104).

Figure 2:
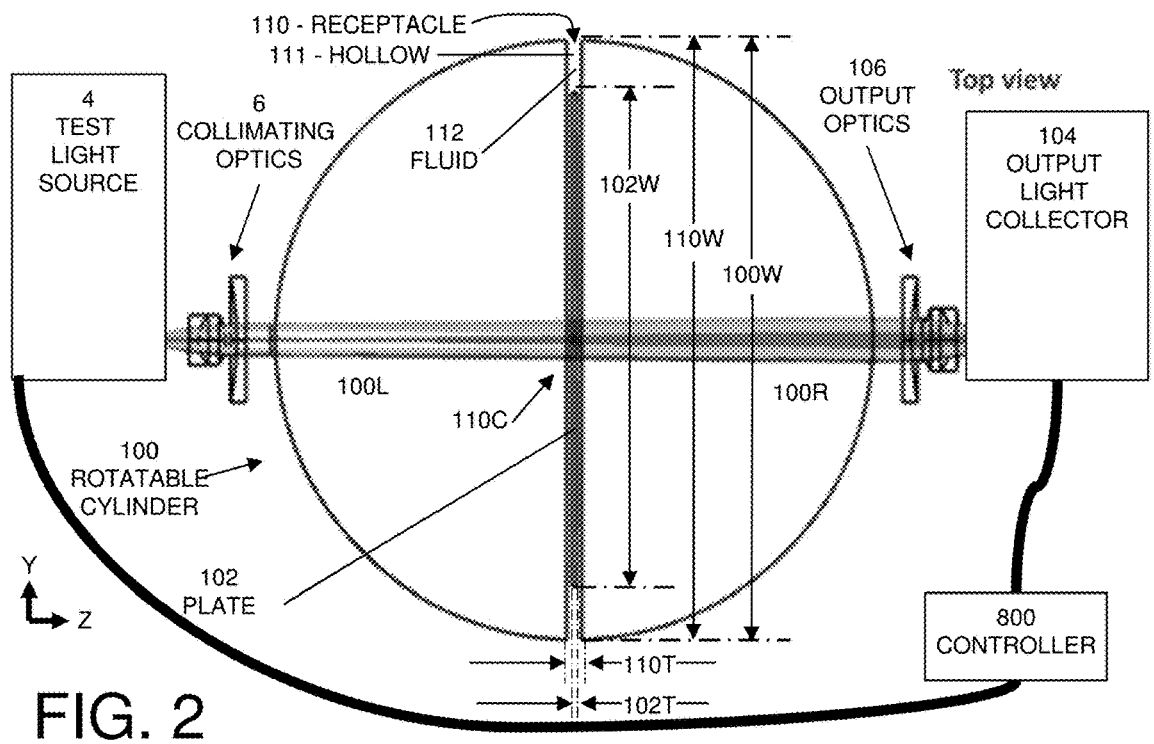
FIG. 2 is a sketch of a top view of the cylinder.

Referring now to the drawings, FIG. 2 is a sketch of a top view of cylinder 100. Optional input cable 6F and optional output cable 104F are not shown in the current figure. The test light source 4 provides an optical input signal to collimating optics 6. Similarly, the output optics 106 feed the output light collector 104. Optionally, optical input signal is input via a polarizer and a 90°±1° rotating apparatus after or before fixed lenses. The coated plate 102 is mounted in the receptacle 110 and surrounded by the fluid 112. In the current top view, side containment for the fluid 112 is not shown. Based on the current description, one skilled in the art will be able to design and implement appropriate containment for the fluid, for example, by using the top portion 404 extended around the cylinder 100. The controller 800 is typically operationally connected at least to the test light source 4 and the output light collector 104.

The plate 102 has a first dimension horizontally (up-down on the page of the current figure, along an axis of the cylinder 100) as plate-width 102W and a second dimension shown as plate-thickness 102T (left-right on the page of the current figure). Similarly, and correspondingly, the receptacle 110 has a first dimension shown as receptacle-width 110W (up-down on the page of the current figure, along an axis of the cylinder 100) and a second dimension shown as receptacle-thickness 110T (left-right on the page of the current figure). The receptacle-width 110W can be slightly smaller than the diameter 100W of the cylinder 100, depending on the size of implementation of side containment for the fluid 112. As noted above, in the current figure the side containment is not shown, and the receptacle width 110W is shown as the same size as the diameter 100W of the cylinder 100. The receptacle-thickness 110T is a distance between the left side of the cylinder 100L and the right side of the cylinder 100R. Alternatively, the receptacle-width 110W can be a different size from the cylinder diameter 100W, for example the receptacle-width 110W being smaller than the cylinder diameter 100W.

Typically, the plate 102 and the receptacle 110 are substantially parallel, that is, the widths of the plate (plate-width 100W) and receptacle (receptacle-width 110W) are aligned. The sides of the receptacle 110 (the edges of the receptacle, distant from the area of the receptacle 110 used to perform the measurement of the plate 102) are typically parallel, but not required to be parallel. Depending on the specific measurement required, a distance between the sides of the receptacle at the edges of the receptacle can be closer or preferably farther apart than a distance between the sides of the receptacle in a core area 110C where the measurement is performed. The core area 110C, also known as the "critical area" is a location where the coating is tested, that is, the location where the light beam encounters the coated plate 102. Typically, the core area 110C is small, and the remaining area of the receptacle 110 can be designed primarily to support the sample test plate 102. A typical core area 110C includes a minimum defined cylinder measuring zone of ±10 mm.

A feature of the current embodiment of the testing apparatus 400 is that the receptacle 110 is small compared to the bath 5100 of the bath-jig 500. An alternative embodiment using a fluid bath is described below in reference to the bath-jig 500 of FIG. 5A. The bath 5100 typically holds 300 cc (cubic centimeters) to 2000 cc of fluid. Conventional baths require minimum of 300 cc of fluid, otherwise the level of the fluid is lower than the light source input and output, and the measurement will be in air (not fluid). Typically, volume of the bath is about 500-600 cc.

In contrast, the receptacle 110 typically holds 0.5 cc to 50 cc of fluid. The receptacle 110 can be adjustable in one or more dimensions to accommodate various sizes of plates 102. Another feature of the current embodiment of the testing apparatus 400 is that the cylinder 100 is rotated (as part of the rotatable assembly, thus, the sample to be tested, coated plate 102, is stationary with respect to the fluid 112 and receptacle 110. In contrast, in the bath-jig 500 the sample (coated plate 102) is rotated within the fluid, that is, within the bath 5100. Due to high viscosity of the fluid 112 the rotation of the plate 102 in the fluid 112 in a bath-jig 500 causes disturbance in the fluid 112 and in turn this affects the measured spectra. This problem is solved at least in part by the use of the cylinder 100.

Figure 3:
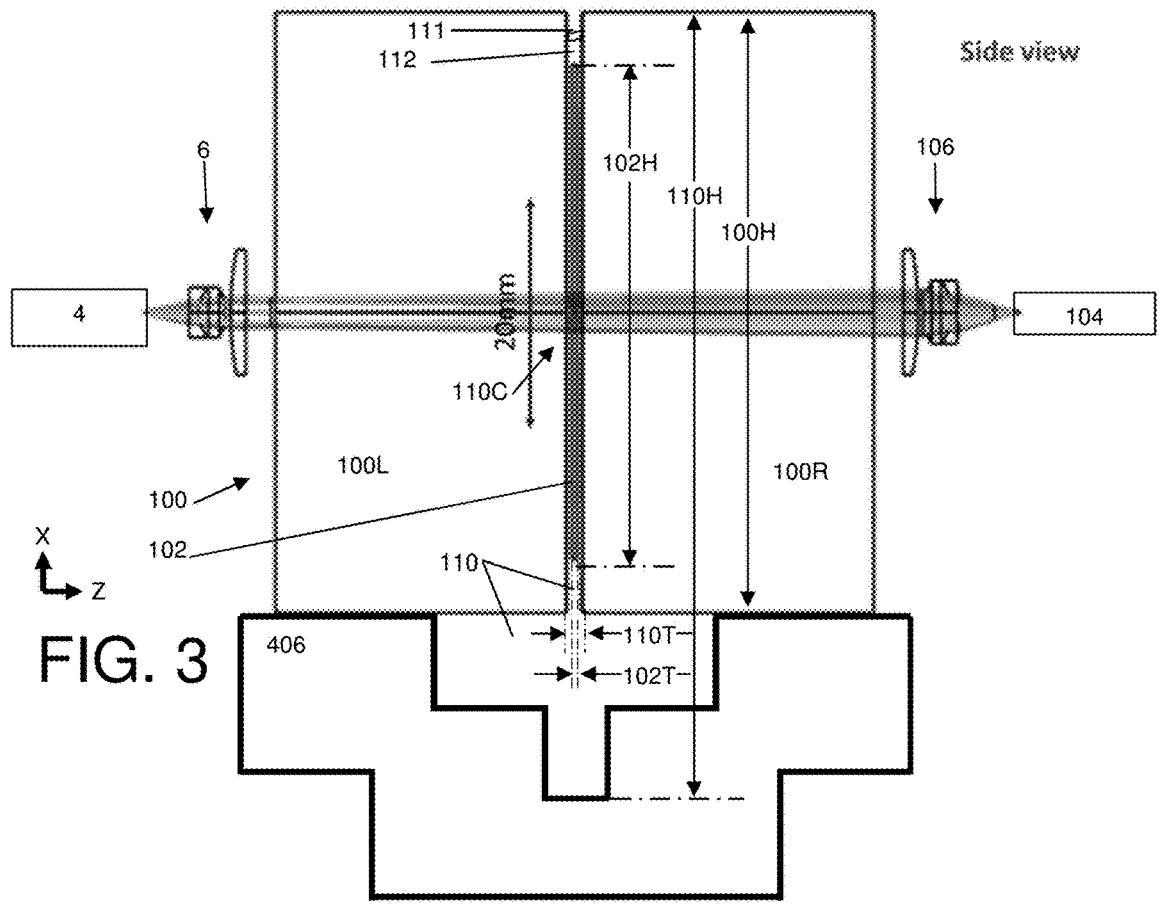
FIG. 3 is a sketch of a side view of the cylinder

Referring now to the drawings, FIG. 3 is a sketch of a sectional side view of the cylinder 100 and bottom portion 406. The plate 102 has a third dimension shown vertically (up-down on the page of the current figure, along a height-axis of the cylinder 100) as plate-height 102H. Similarly, and correspondingly, the receptacle 110 has a third dimension shown as receptacle-height 110H. The receptacle-height 110H can be the same size as cylinder height 100H of the cylinder 100. Alternatively, the receptacle-height 110H can be a different size from the cylinder height 100H. For example, the receptacle-height 110H can be smaller than the cylinder height 100H to account for a fluid containment implementation (sealing) at the bottom of the hollow 111, in the hollow 111 between the left side 100L and the right side 100R of the cylinder. Or for example, the receptacle height 110H can be greater than the cylinder height 100H (as shown in the current figure) and the bottom portion 406 provides sealing at the bottom (below) of the hollow of the receptacle 110.

Figure 4:
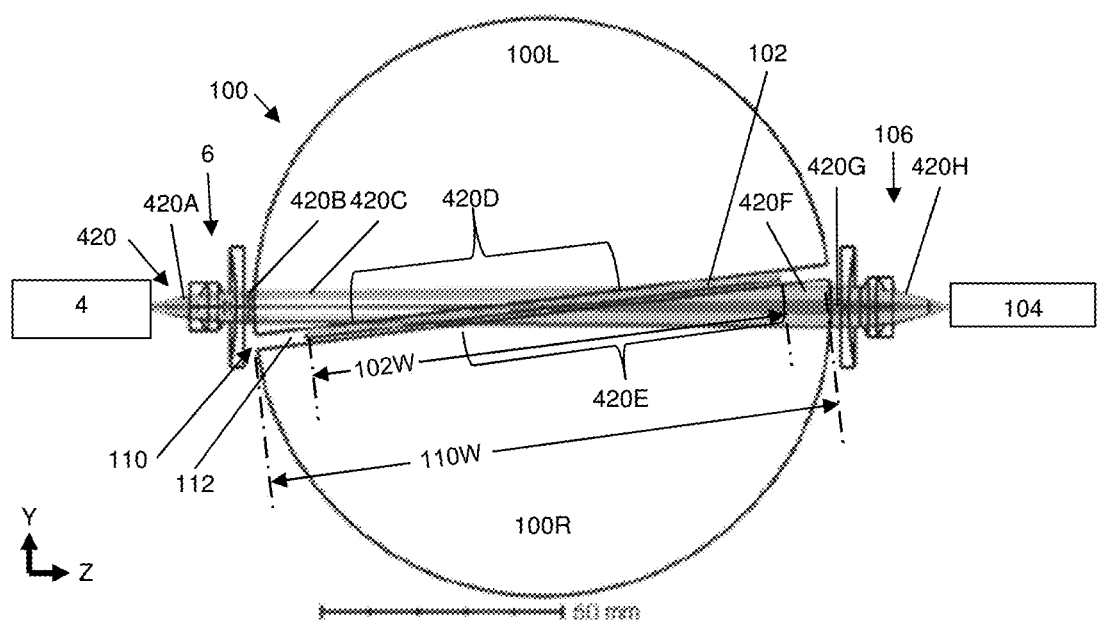
FIG. 4 is a sketch of a top view of the cylinder with the coated plate rotated during testing.

Referring now to the drawings, FIG. 4 is a sketch of a top view of the cylinder 100 with the coated plate 102 rotated during testing. In this non-limiting example, the coated plate 102 has been rotated clockwise almost 90° from the starting position shown in the above figures.

As can be seen in the current figure, a light beam 420, in this case optical light (as a test signal), is provided 420A by the test light source 4 (optional input cable 6F is not shown). The provided 420A light beam is prepared and collimated by the collimating optics 6, and then is input 420B normal to a surface area of the rotatable cylinder 100. The precision of the shape of the cylinder 100 can be determined by the required precision of measurement of the coating on the plate 102. The light beam travels 420C via the left side of the cylinder 100L until reaching the receptacle 110. The light beam traverses (420D-420E) from the left side of the cylinder 100L into the fluid 112 in the receptacle 110, through the coated glass plate 102 (note, the coating on the glass plate is not shown), through the fluid 112 on the other side of the plate 102 and into 420E the right side of the cylinder 100R.

Then the signal traverses 420F the right side of the cylinder 100R and exits 420G normal to the surface of the rotatable cylinder 100. Output optics 106 passes an output light beam as an output signal 420H to the output light collector 104 (optional output cable 104F is not shown in the current figures).

As a cylinder only has one circumferential surface, references to inputting the optical light beam and exiting/outputting the optical light beam are to different areas or regions of the surface. Correspondingly, first and second sides of the cylinder are directional references, as can be seen in the figures as shown on the pages.

Figure 5A:
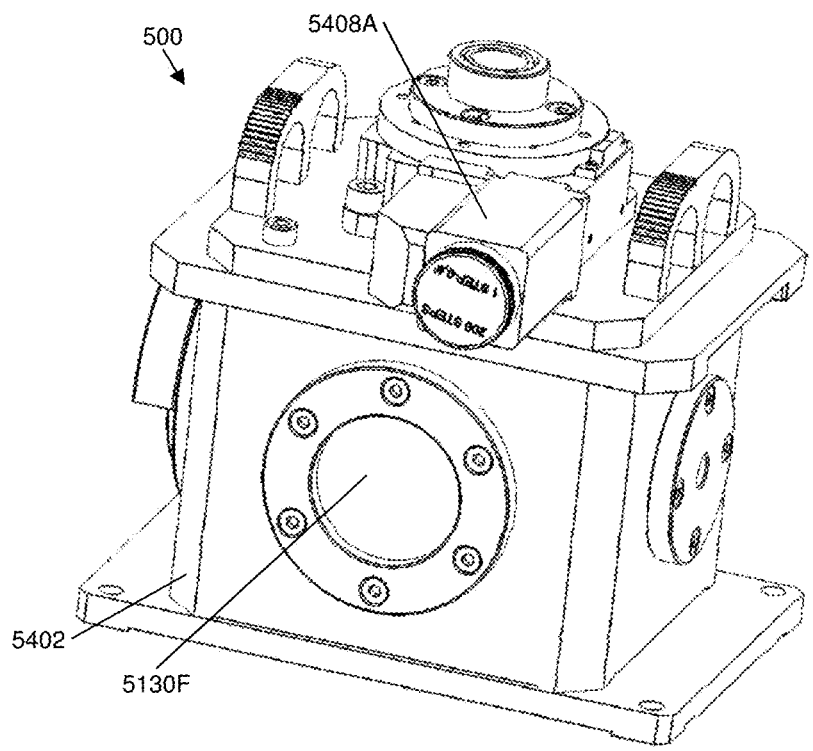
FIG. 5A, is a sketch of a bath-jig apparatus for testing transmittance of an optical sample.
Figure 5B:
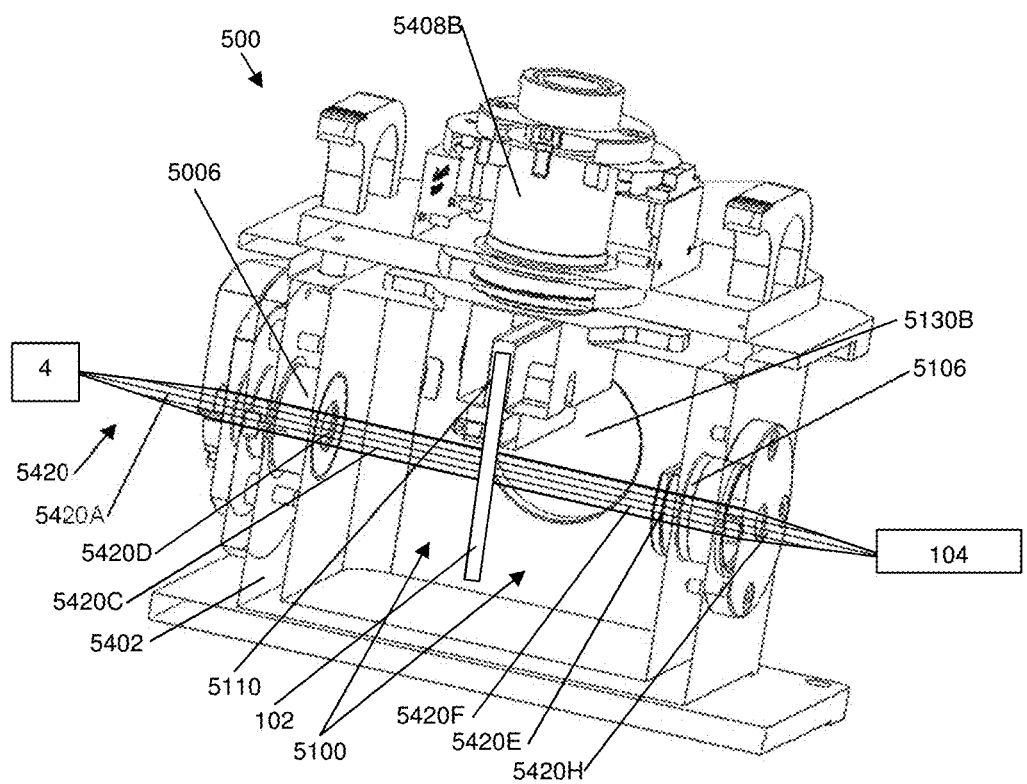
FIG. 5B is a sketch of a sectional view of the bath-jig apparatus.

Alternative Apparatus—FIGS. 5A to 5B.

Referring now to the drawings FIG. 5A, is a sketch of a bath-jig apparatus for testing transmittance of an optical sample and FIG. 5B is a sketch of a sectional view of the bath-jig apparatus. The testing bath-jig apparatus 500 is generally referred to in the context of this document as a "bath-jig" 500. Similar to the testing apparatus (jig) 400, the bath-jig 500 holds the plate being tested, support structure, and guides the elements. The bath-jig 500 includes a base 5402 to which various other elements are mounted. The coated plate 102 being tested is seated in a plate-mount 5110 in a bath 5100. The bath 5100 is an area of the bath-jig 500 built to contain fluid. The bath 5100 is an internal, hollow space of the bath-jig 500, designed as a fluid containment area. The bath 5100 is filled with the fluid 112 (not shown in the current figures). A test light source 4 provides an optical input signal via optional input cable 6F (not shown) to collimating optics 5006. The collimating optics 5006 (prepare and focus) collimates the input signal into the bath 5100.

The plate-mount 5110 can be rotated by a variety of means. In the current figures, exemplary motor attachment area 5408B is provided at the top of the bath-jig 500, and also shown with a motor 5408A connected.

As can be seen in the FIG. 5B, a light beam 5420, in this case optical light, is provided 5420A by the test light source 4. The provided 5420A light beam is prepared and expanded by the collimating optics 5006 and traverses into the fluid 112 in the bath 5100. The light beam then travels 5420C through the fluid 112 in the bath 5100, through the coated glass plate 102 (note, the coating on the glass plate is not shown), through 5420F the fluid 112 on the other side (of the plate 102). As the bath 5100 is filled with the fluid 112, this traversal of the light beam through the bath-jig 500 is substantially without refraction. Then the signal exits 5420E from the fluid 112 to output optics 5106 that feed 5420H the output signal to the output light collector 104.

The bath-jig 500 is shown with an optional front window 5130F and back window 5130B that allow the internal bath 5100, plate-mount 5110, coated plate 102, and other components to be viewed.

Both the testing apparatus (jig) 400 and the bath-jig 500 can include optional, additional, and alternative configurations. In one alternative, the jigs can be adapted to include vacuum, such as a vacuum bell, to extract dissolved air from the fluid 112. In another alternative, mechanical and/or other enhancements can be used to handle and prevent wobbling in the jigs. Hard fixation (rigid routing) can be used on the optical fibers. The receptacle 110 and plate-mount 5110 can be adjustable to accommodate variable size plates 102. As described above regarding the position pins 410, the jigs, top 404 and bottom 406 portions can be detachable (removably attached) to facilitate replacement with a different refractive index cylinder and ease of operation (for example, sample placement and cleanup).

Additional alternatives for the jigs can include a dark (light opaque) box to cover the entire jig, a dynamic receptacle for the test plate to avoid scratching the plate 102, rotating stages including engine and drivers, an inner clean option, air bubbles extraction (a stagnation area), and sample plate squeezers.

Method—FIG. 6A to FIG. 7B

Figure 6A:
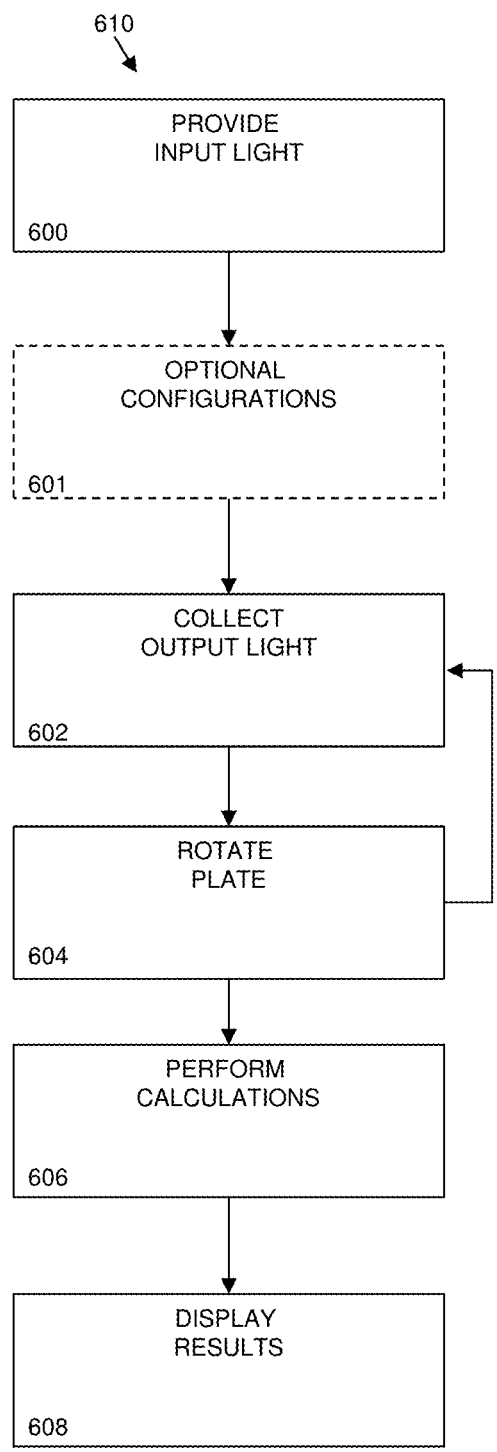
FIG. 6A is a flowchart of a method for optical sample characterization.

Referring now to FIG. 6A is a flowchart of a method for optical sample characterization. The current method can be used with the testing apparatus (jig) 400 and the bath-jig 500, as well as with the below-described MPL testing apparatus 1450, as described below in a testing sequence. A method of testing 610 for optical sample characterization starts in step 600, the light beam 420 is provided normal to the cylinder 100. The light beam is typically an optical light beam, referred to as the "input light", or simply as "light", as will be clear to one skilled in the art from the context of this description. Providing the light at a constant normal to the cylinder 100 facilitates the majority of the light coupling into the cylinder 100, so that no light, or minimal light is lost when entering the cylinder. Exemplary coatings include filters that transmit a part of the visible spectrum and reflect another part, a polarizing filter that transmit one polarization state and reflects another polarization state, or an absorbing coating that absorbs part of the visible light.

In step 601, optional configurations are used, as described below.

In step 602, the output light is collected after traversing the cylinder 100, the receptacle 110, and the plate 102, as described above. The output light can be collected, for example, with a spectrometer.

In step 604, the plate 102 is rotated. To what degree the plate is rotated depends on the specific requirements of the test being performed and the measurements desired. Exemplary rotations include 0.5° and 1° steps. After rotating the plate, output light can again be collected (step 602) at the new, known angle. This cycle of rotating and collecting can be repeated as necessary to gather data on the desired range of angles to be tested (step 604 returns to step 602).

Note that a feature of the current embodiment is that the plate 102 is rotated by rotating the entire cylinder 100, in contrast to conventional implementations that rotate a test sample inside a testing apparatus, for example, in a bath of fluid inside a testing chamber. In step 606, optional calculations (processing, signal processing) can be performed on the collected signals to determine a figure of merit for transmittance and/or reflectance of the coating and/or plate 102. The data from the collected output light 602 is processed to calculate results of the optical testing.

In step 608, optionally the results of the collection and processing can be displayed (output, transferred, stored, etc.).

Figure 7A:
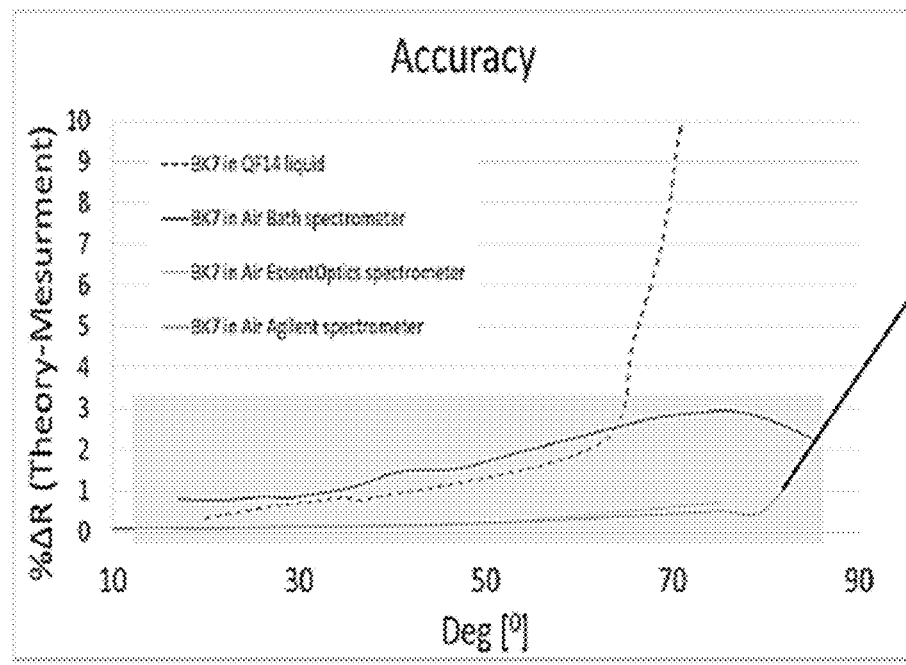
FIG. 7A is a plot of transmittance (y-axis) vs. angle (x-axis).
Figure 7B:
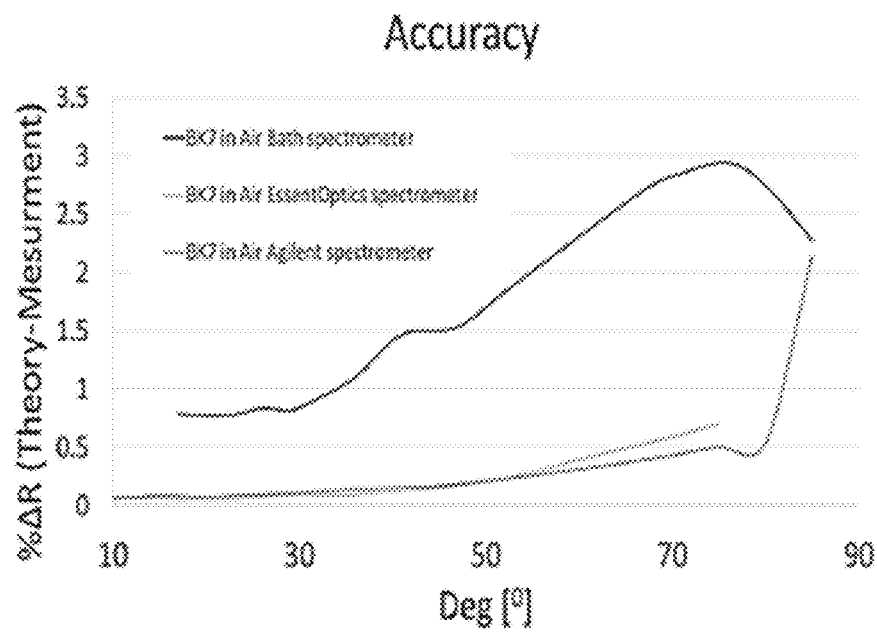
FIG. 7B is a close-up (zoom in) of the transmittance plot of FIG. 7A.

Referring now to FIG. 7A, shown is a plot of transmittance (y-axis) vs. angle (x-axis), and FIG. 7B, showing a close-up (zoom in) of the transmittance plot of FIG. 7A. In general, a successful coating is shown by the plot being horizontally oriented, indicating that over a range of angles the coating had consistent transmittance. The transmittance (amount of light provided minus the amount of light collected) can be of the s or p polarization.

Figure 8:
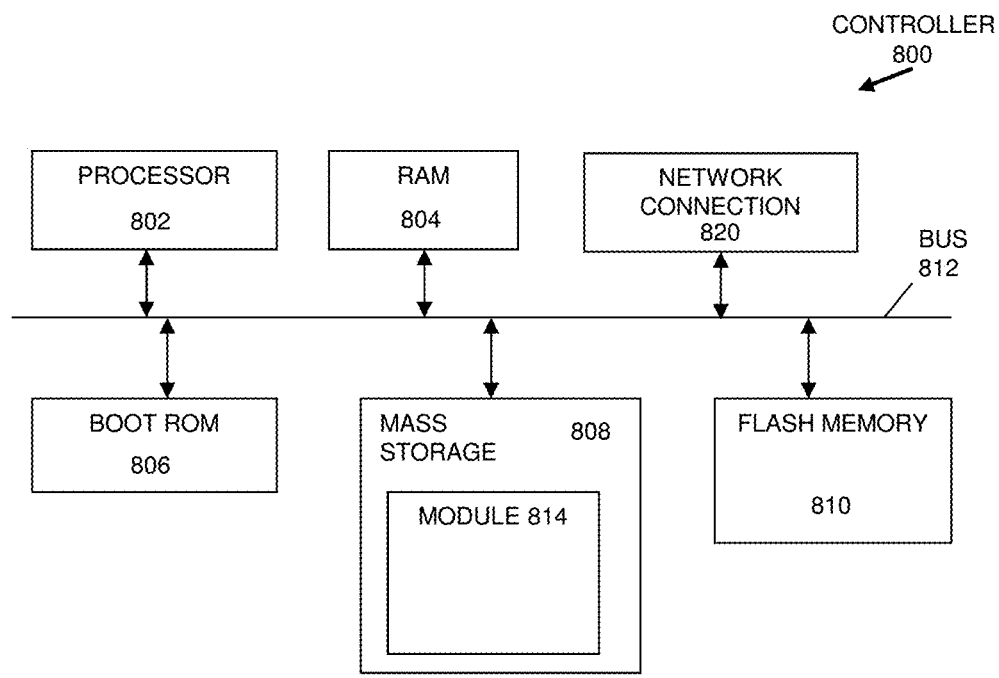
FIG. 8 is a high-level partial block diagram of an exemplary controller

Controller—FIG. 8

FIG. 8 is a high-level partial block diagram of an exemplary controller 800 configured to implement the method for optical sample characterization 610 of the present invention. Controller (processing system) 800 includes a processor 802 (one or more) and four exemplary memory devices: a random-access memory (RAM) 804, a boot read only memory (ROM) 806, a mass storage device (hard disk) 808, and a flash memory 810, all communicating via a common bus 812. As is known in the art, processing and memory can include any computer readable medium storing software and/or firmware and/or any hardware element(s) including but not limited to field programmable logic array (FPLA) element(s), hard-wired logic element(s), field programmable gate array (FPGA) element(s), and application-specific integrated circuit (ASIC) element(s). Any instruction set architecture may be used in processor 802 including but not limited to reduced instruction set computer (RISC) architecture and/or complex instruction set computer (CISC) architecture. A module (processing module) 814 is shown on mass storage 808, but as will be obvious to one skilled in the art, could be located on any of the memory devices.

Mass storage device 808 is a non-limiting example of a non-transitory computer-readable storage medium bearing computer-readable code for implementing the testing methodology described herein. Other examples of such computer-readable storage media include read-only memories such as CDs bearing such code.

Controller 800 may have an operating system stored on the memory devices, the ROM may include boot code for the system, and the processor may be configured for executing the boot code to load the operating system to RAM 804, executing the operating system to copy computer-readable code to RAM 804 and execute the code.

Network connection 820 provides communications to and from controller 800. Typically, a single network connection provides one or more links, including virtual connections, to other devices on local and/or remote networks. Alternatively, controller 800 can include more than one network connection (not shown), each network connection providing one or more links to other devices and/or networks.

Controller 800 can be implemented as a server or client respectively connected through a network to a client or server.

Alternative Apparatus—FIGS. 9 to 15.

Figure 9:
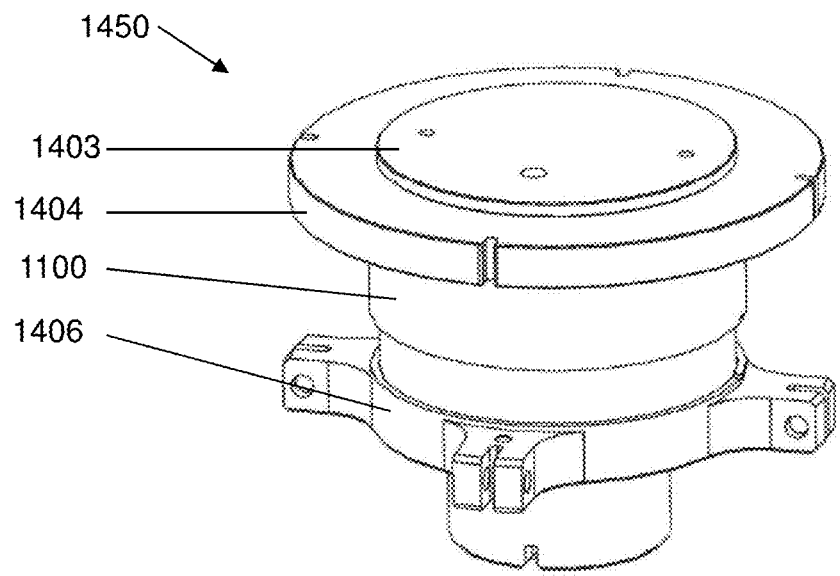
FIG. 9 is a sketch of an apparatus for full-range optical sample characterization (testing).
Figure 10:
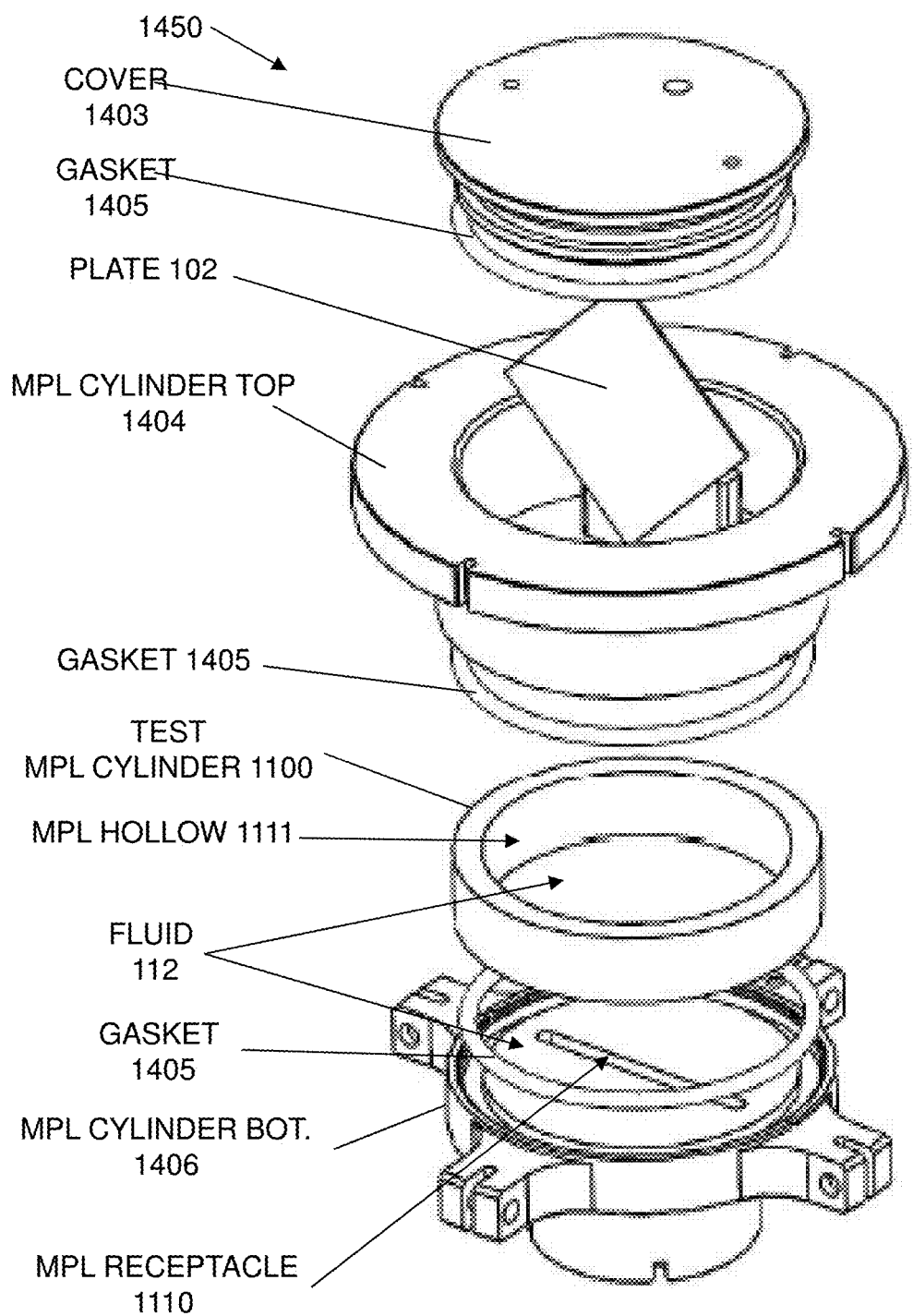
FIG. 10 is a sketch of an exploded view of the MPL apparatus.

Referring now to the drawings FIG. 9, is a sketch of an apparatus for full-range optical sample characterization (testing) and FIG. 10 is a sketch of an exploded view of the apparatus. The variable position testing apparatus 1450 is also referred to in the context of this document as an "MPL apparatus" or "MPL". The term "MPL" refers to "mounting a plate in liquid" which is a typical non-limiting use for the testing apparatus 1450. The core MPL apparatus can be configured similarly to the above-described testing apparatus 400, and not shown in the current figures are a support structure, base, and related elements, as will be obvious to one skilled in the art.

The MPL apparatus 1450 can be configured inside a spectrophotometer measuring configuration (tool) to create a fuller MPL testing system. The MPL testing system provides an apparatus and method for testing and measurements including, but not limited to, reflection, transmittance, and chromaticity of a coating between a substrate material and the incident material for different angles relative to the coating on a plate.

A cover 1403 is attached to an MPL cylinder top portion 1404. A test MPL cylinder 1100 is between the MPL cylinder top (top portion) 1404 and an MPL cylinder bottom (bottom portion) 1406. Gaskets 1405 are a non-limiting example of parts used to assist in operationally configuring the MPL testing apparatus 1450, in this case designed to be seated in a groove and compressed during assembly between two or more parts, creating a seal at interfaces between elements of the apparatus.

Similar, and corresponding to the above-described testing apparatus 400, the exemplary optical material (sample of optical material) being tested is a coated plate 102 seated in the MPL testing apparatus 1450. The MPL cylinder 1100 includes an MPL hollow 1111 in at least a portion of the interior of the MPL cylinder 1100. Typically, the MPL hollow 1111 is a central hollow on an axis of the MPL cylinder 1100. The MPL hollow 1111 is sized to receive at least a core area of the sample of optical material (coated plate 102). The MPL hollow 1111 is an interior part of an MPL receptacle 1110. The MPL receptacle 1110 is sealed for receiving a quantity of fluid 112, such that the fluid 112 surrounds and is in contact with at least the core area of coated plate 102, and the fluid 112 is in contact with the MPL cylinder 1100. As will be obvious to one skilled in the art, references in this description to the fluid 112 in the MPL hollow 1111 can also be to the fluid 112 in the MPL receptacle 1110. In some implementations, the refraction index of the glass of the MPL cylinder 1100 matches the refractive index of the fluid 112. In some implementations, the MPL cylinder 1100 and the plate 102 are made of the same material (so the respective indices of refraction match). Regarding specific matching of indexes and ranges of difference between element's refractive indexes, one skilled in the art will be aware of the allowable tolerances.

A feature of the current embodiment is to mount a coated plate 102 in a cylinder, the MPL cylinder 1100, having circular symmetry. This enables measurement of light reflected by the plate 102 at different angles, in particular large angles with respect to a normal to the surface of the plate 102.

Figure 11A:
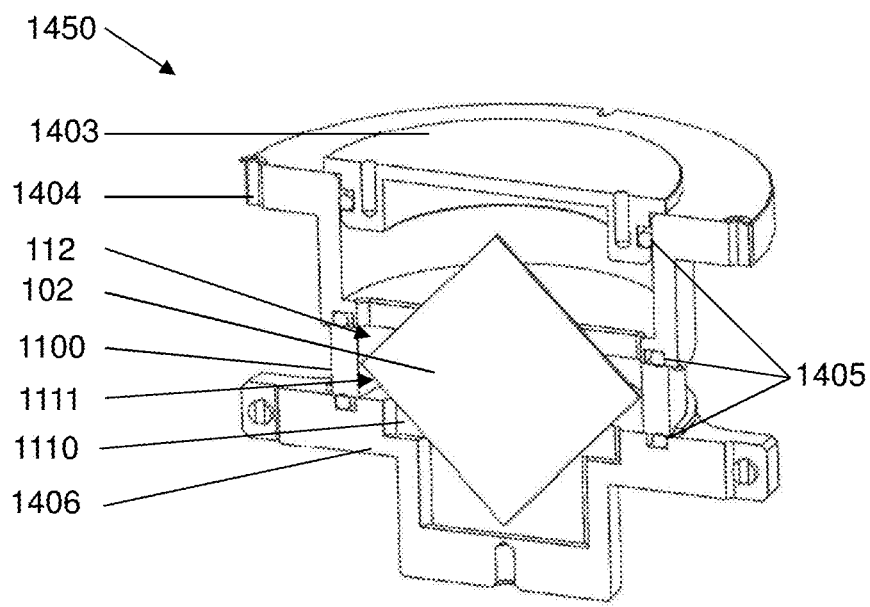
FIG. 11A is a sketch of a sectional view of the MPL testing apparatus.
Figure 11B:
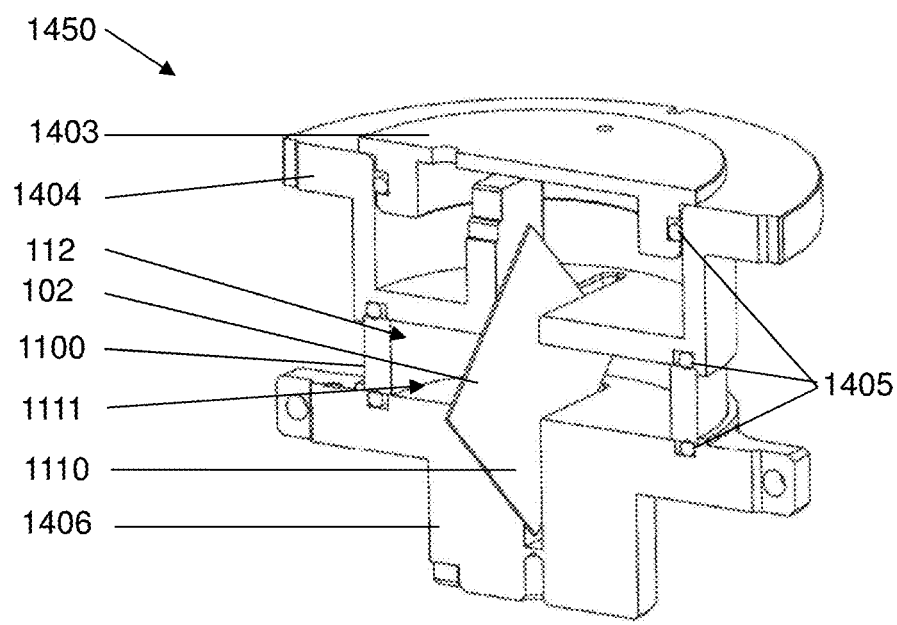
FIG. 11B is a rotated sectional view of the MPL testing apparatus.

Referring now to the drawings FIG. 11A, is a sketch of a sectional view of the MPL testing apparatus, and FIG. 11B is a rotated sectional view. As can be seen in the current figure, the plate 102 is preferably positioned (mounted) with the plate's diagonal on the equator (see below FIG. 14A, the equator 1100E), so as to increase area of inspection (core area), and enable larger angle of inspection (AOI) with no vignetting.

Figure 12:
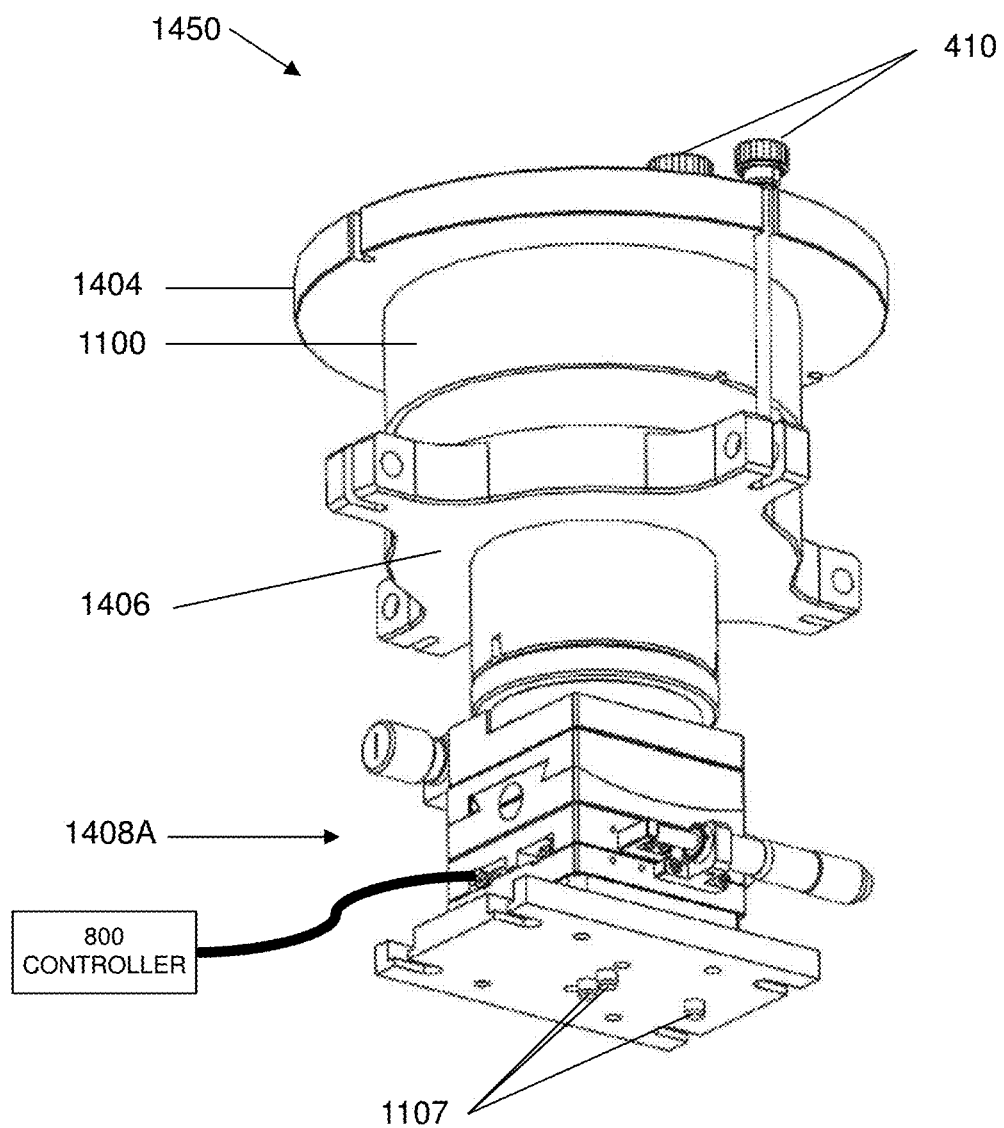
FIG. 12 is a sketch of the MPL testing apparatus including a variable positioning mechanism.

Referring now to the drawings FIG. 12, is a sketch of the MPL testing apparatus including a variable positioning mechanism. The MPL testing apparatus 1450 can be varied in position, in particular optionally and preferably varying all six degrees of mechanical positioning. Positioning includes stationary, rotate in a single axis, rotate in one or more axes, raising, and lowering, to move the plate 102 for testing of various incident angles and areas of the plate. A non-limiting exemplary implementation for varying the position of the apparatus is using a variable positioning mechanism 1408A, for example, mechanical actuators for accurate positioning. The variable positioning mechanism 1408A is appropriately operationally attached to the MPL cylinder bottom portion 1406 and normally to a base (not shown, similar to the testing apparatus 400 base 402). An exemplary implementation is the variable positioning mechanism 1408A being a turntable, implemented by the MPL cylinder bottom portion 1406 having a motor attachment area with a motor connected. The variable positioning mechanism 1408A varies the position of the MPL testing apparatus 1450, thus varying the position of the plate 102.

Preferably, the MPL cylinder 1100 should be mounted (configured) to minimize obstacles surrounding the MPL cylinder 1100. This enables measurements at a maximum range of angles (substantially 360°) around the MPL cylinder 1100, and hence enabling direct-view of the plate 102 within the MPL cylinder 1100. Position pins 410 can be used to clamp the MPL cylinder 1100 between the MPL cylinder top portion 1404 and the MPL cylinder bottom portion 1406. In the current figure, two exemplary position pins 410 are shown. When used, these position pins 410 should be placed in consideration of the desired measurement angles, so as to minimize obstruction by the pins in the desired range of testing angles.

The MPL cylinder top portion 1404 and the MPL cylinder bottom portion 1406 can be used for supporting and mounting various implementations of the MPL cylinder 1100. For example, the MPL cylinder 1100 can be clamped between the top and bottom portions, facilitating alternative MPL cylinders 1100, top 1404, and bottom 1406 portions being used. For example, the top portion 1404 can be changed to a second top portion including a different size and/or configuration of receptacle to test a different plate. Or for example, a cylinder composed of a first material having a first index of refraction for testing a plate having a first index of refraction can be replaced with a cylinder composed of a second material having a second index of refraction for testing a plate having a second index of refraction. In another example, the cylinder, top, and bottom portions are all replaced with alternative elements having (creating) a wider/thicker receptacle for testing a thicker plate, or for creating a different shaped receptacle for testing a different shape of optical sample, for example round.

A controller 800 is connected to the variable positioning mechanism 1408A and functions similar to the operation of the controller 800 with the testing apparatus 400 and the motor 408A. For clarity, the controller 800 is not shown in all figures. Optionally, positioning items 1107 (for example, pins) can provide the dynamic freedom to replaceably remove and return accurately the MPL testing apparatus 1450 to a given position.

Figure 13:
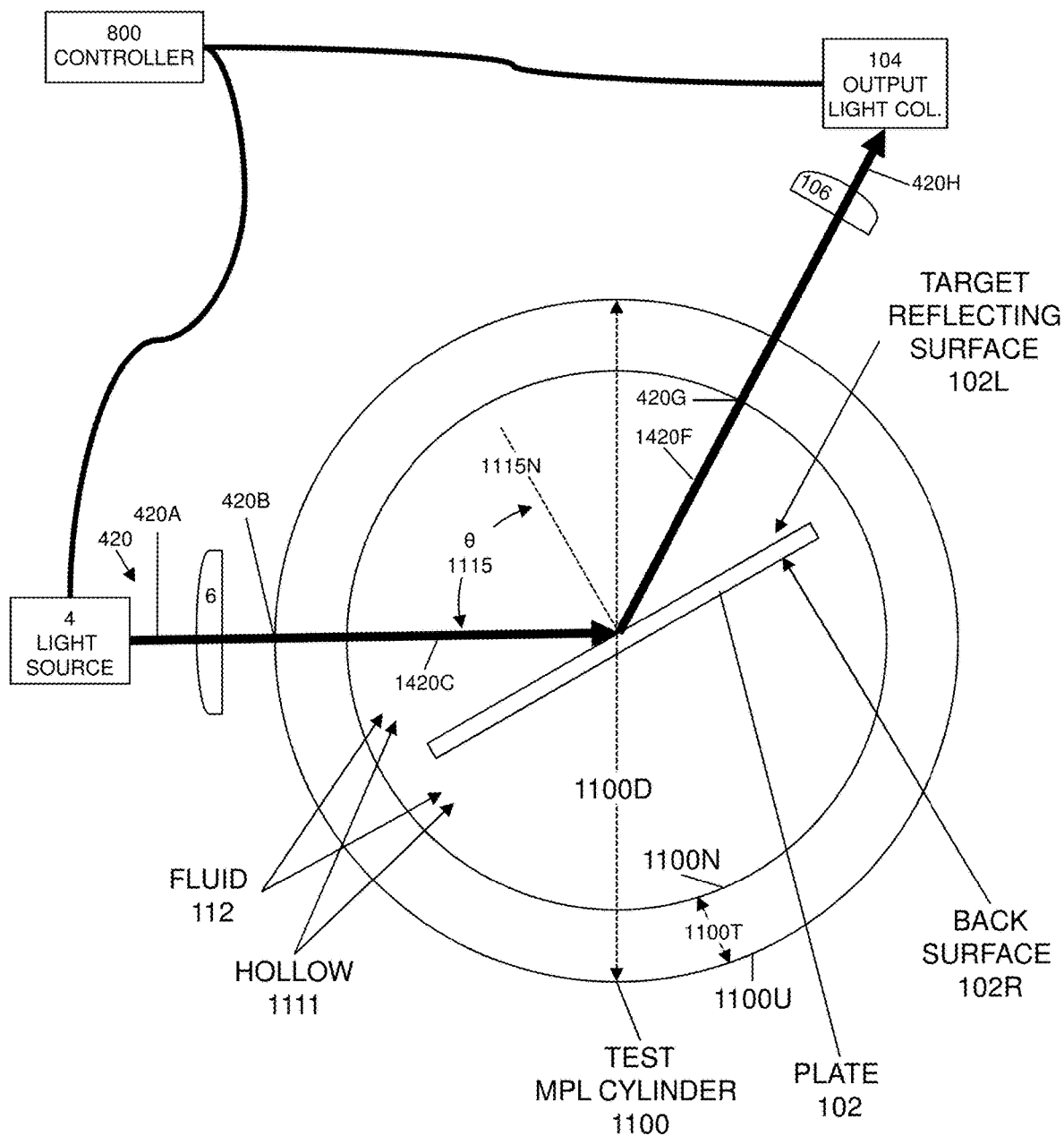
FIG. 13 is a sketch of cross section of the MPL cylinder for testing of a plate.

Referring now to the drawings FIG. 13, is a sketch of cross section of the MPL cylinder for testing of a plate. The plate 102 is mounted inside the MPL cylinder 1100. The plate 102 has a first side, referred to in the context of this document as a "target reflecting surface" 102L, "target surface", "coated surface", or "front surface". The target surface 102L is typically the surface of interest to be tested, and may be coated with one or more coatings. Alternatively, the target surface 102L may be uncoated. The plate 102 has a second side, opposite the first side, referred to in the context of this document as the "back surface" 102R. The back surface 102R is typically uncoated, but may be coated with one or more coatings. For simplicity, the coatings are not shown in the figures. For convenience of reference in the figures, the target surface 102L is a first surface typically drawn facing left on the page, the "left side" of the MPL cylinder 1100 and the plate 102. Correspondingly, the back surface 102R is a second surface drawn facing the right on the page, the "right side" of the MPL cylinder 1100 and the plate 102. As described above (see FIG. 11A, and FIG. 11B) the plate 102 can be mounted such that the target reflecting surface 102L is at the center of the diameter of the MPL cylinder 1100. The MPL cylinder 1100 has an MPL cylinder diameter 1100D from an exterior outside surface 1100U to an opposite outside surface and an MPL cylinder thickness 1100T from an outside surface 1100U to an inside surface 1100N of a ring of the circumference.

Similar to the optical arrangement used for testing the above-described testing apparatus 400, a light beam 420 is provided 420A by an input test light source 4 as an optical input signal. The provided 420A light beam is optionally prepared and collimated by collimating optics 6, and then is input 420B normal to a surface area of the MPL cylinder 1100. The light beam travels 1420C (via the "left side") toward the target surface 102L of the plate 102, impinging on the (coated) target surface 102L. In the current figure, the hollow 1111 is an entire interior portion of the MPL cylinder 1100, the fluid 112 fills the hollow 1111 and surrounds the plate 102, in contact with both the target surface 102L and the back surface 102R. In this case, the light beam travels 1420C via the left side, through the fluid 112, toward the target surface 102L of the plate 102.

A normal line 1115N is defined normal to the surface of the plate 102, at the core area, at a location where the light beam 1420C impinges the target surface 102L of the plate 102. A test angle θ (theta, 1115) is defined between the line of the light beam 1420C and the normal line 1115N. The target surface 102L of the plate 102 is closer, on the side toward the test light source 4 as compared to the back surface 102R of the of the plate 102 that is farther away, on the side of the plate 102 opposite the test light source 4.

After the light beam 420 impinges on the target surface 102L, a portion of the beam may reflect from the surface of the plate 102, shown as reflected output beam 1420F. A portion of the beam may enter and traverse the plate 102 (not shown in the current figure, similar to the above description, for example, of the testing apparatus 400 and FIG. 4). The portions of the beam that reflect from, and enter into the plate 102 are determined by the specifics of implementation, such as the index of refraction of the fluid 112 in the hollow 1111 and in the receptacle 1110, the angle of incidence (test angle θ 1115) between the input signal (the light beam 1420C) and the plate 102, the index of refraction and properties of any coatings, and the index of refraction of the plate 102.

In the current reflectance test, the output beam 1420F travels via the "left side" away from the target surface 102L of the plate 102. The output beam 1420F travels away from the plate 102 via the same side of the plate 102 as the incoming light beam 1420C travelled toward the plate 102. In the current case of the fluid 112 filling the hollow 1111 and surrounding the plate 102, the output beam 1420F travels from the target surface 102L, through the fluid 112, toward an interior surface of the MPL cylinder 1100. The output beam 1420F exits 420G normal to both an interior surface area (interior curved surface) and exterior curved surface of the MPL cylinder 1100. The output beam 1420F is optionally prepared by the output optics 106 and passes as output signal 420H to the output light collector 104. Optional input cable 6F, output cable 104F, and other supporting elements are not shown in the current figure. As described above, the collimating optics 6 and the output optics 106 are preferably adjustable with at least two degrees of freedom to allow adjustment of the light beam, initial, and subsequent calibration.

A feature of the current embodiment is that the location of the output light collector 104 is adjustable, in particular rotatably adjustable with respect to the location of the test light source 4, configured to receive a reflected signal from the plate 102 under test. The location of the output light collector 104 can be calculated, or otherwise determined (such as experimentally) based on the specifics of implementation (described above, such as the location of the test light source 4, indexes of refraction, etc.). In one implementation, during rotation of the plate 102, the output light collector 104 is synchronized and rotated at twice the angle of the rotation of the plate 102, relative to the same axis. For example, if the plate 102 is rotated 2 (two) degrees on the vertical axis of the MPL cylinder 1100, then the output light collector 104 will be rotated around the exterior of the MPL cylinder 1100 4 (four) degrees. In alternative implementations, the output light collector 104 can be positioned by manual inspection of the location of the output light beam 420H, or by measuring at the output light collector 104 the strength of the output signal 420H and positioning the output light collector 104 to maximize the strength of the received output signal 420H. Typically, the plate 102 is vertical, aligned parallel to the height axis of the MPL testing apparatus 1450. The light source 4 and light collector 104 are correspondingly in a horizontal plane, aligned with the diameter of the MPL cylinder 1100, and aligned with the normal line 1115N to the surface of the plate 102. In other words, the output light collector 104 can be configured in a plane defined by the light source 4 and the normal line 1115N.

Measurement of transmittance of the light beam 420 via the plate 102 has been described above with respect to the testing apparatus 400 and cylinder 100. One skilled in the art will be able to apply the above description to the current embodiment of MPL testing apparatus 1450 with MPL cylinder 1100 and, will not be described here in detail.

Figure 14A:
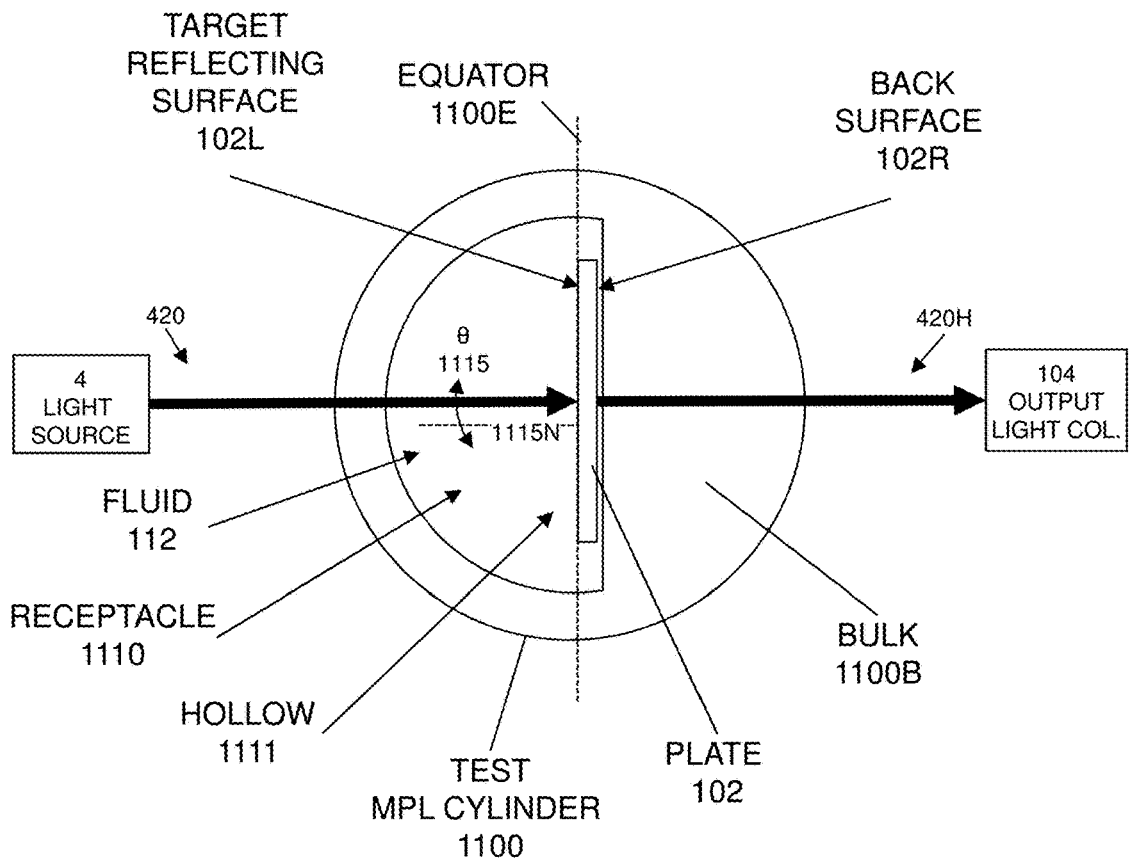
FIG. 14A is a sketch of a cross section of an implementation of an alternative implementation of the MPL cylinder.
Figure 14B:
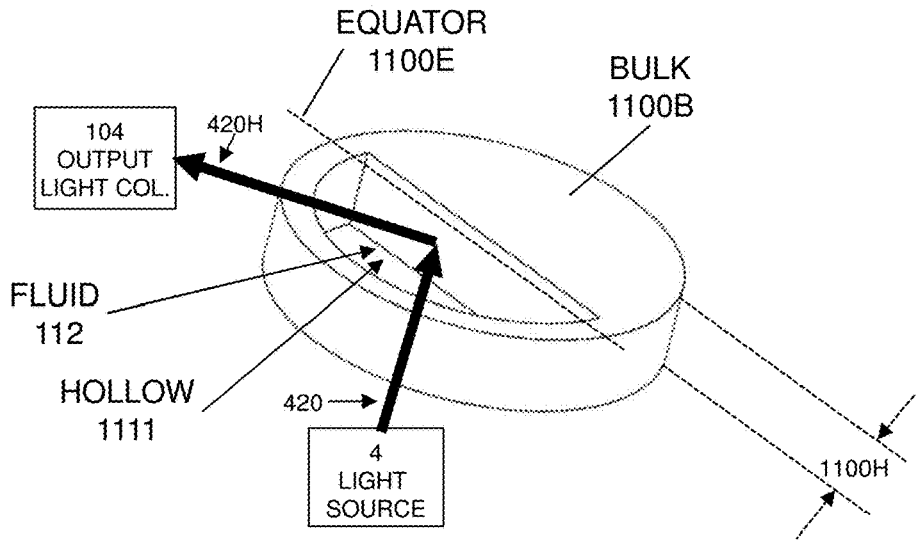
FIG. 14B is a sketch of a sectional view of an implementation of an alternative implementation of the MPL cylinder.

Referring now to the drawings FIG. 14A, is a sketch of a cross section and FIG. 14B is a sketch of a sectional view of an implementation of an alternative implementation of the MPL cylinder. In FIG. 14A the MPL cylinder 1100, and correspondingly the plate 102, are oriented and the light collector 104 positioned for a transmittance test. In FIG. 14B the MPL cylinder 1100, and correspondingly the plate 102, are oriented and the light collector 104 positioned for a reflectance test. The target reflecting surface 102L is parallel and aligned with an equator 1100E of the MPL cylinder 1100. The equator 1100E is a diameter of the cylinder. Also shown in this figure is an MPL cylinder height 1100H from a top side of the MPL cylinder 1100 for contact with the MPL cylinder top portion 1404 to a bottom side of the MPL cylinder 1100 for contact with the MPL cylinder bottom portion 1406.

In the exemplary transmittance test implementation of FIG. 14A, the plate 102 is normal to the input test light beam 420, the test angle θ (1115) is 0° (zero degrees, shown in the figure for reference), and the output light collector 104 is located on the second side ("right side") 102R of the MPL cylinder 1100. Note that the normal line 1115N in this figure is drawn offset slightly from the light beam 420 so the that the normal line 1115N can be seen. A bulk material 1100B is shown. The bulk material 1100B is referred to in the context of this document as "bulk", and described below.

Referring now also to the drawings FIG. 14B, is a sketch of the MPL cylinder of FIG. 14A as viewed from above at an angle. For clarity, the plate 102 is not shown in the current figure. In the current figure, unlike in FIG. 14A, the test light source 4 and the output light collector 104 are configured for a reflectance test of the plate 102. The input test light beam 420 and the output signal 420H are at oblique angles to the target reflecting surface 102L.

Figure 14C:
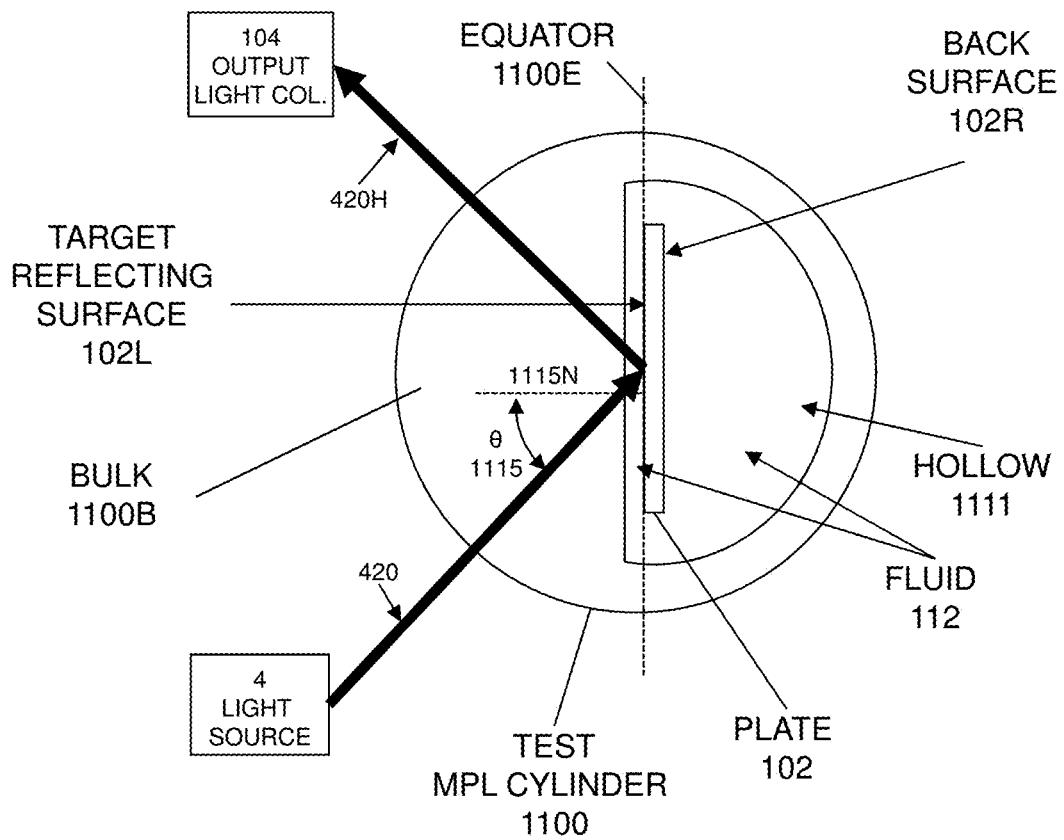
FIG. 14C is a sketch of a cross section of an implementation of an alternative implementation of the MPL cylinder.

Referring now to the drawings FIG. 14C, is a sketch of a cross section view of an alternative implementation of the MPL cylinder. In the above-described FIG. 14A the majority of the path of the test light beam (the light beam 420 and the output signal 420H) traversed the MPL cylinder 1100 via the fluid 112. In the current figure, the majority of the path of the test light beam (420, 420H) traverses the MPL cylinder 1100 via the bulk 1100B and then via a small amount of the fluid 112 (small relative to the length of the light path through the bulk 110B or the size of the fluid 112 in the hollow 1111 of the half-cylinder MPL cylinder 1100. In the current figure, the MPL cylinder 1100, and correspondingly the plate 102, are oriented for a reflectance test, as are the light source 4 and the light collector 104 positioned for a reflectance test. The target reflecting surface 102L is parallel and aligned with the equator 1100E of the MPL cylinder 1100. In the case of a reflectance test, the light beam 420 is at a test angle θ (1115) relative to the normal line 1115N to the plate 102 (or equivalently, normal to the equator 1100E), and the output light collector 104 is located on the same side ("left side", the target reflecting surface side) 102L of the MPL cylinder 1100 as the light source 4A bulk material 1100B is shown.

When performing a reflectance test, reducing or eliminating reflections from surfaces other than the surface under test is desirable. For example, when testing the front, target reflecting surface 102L, and/or a coating on the front surface 102L, a portion of the input light beam 420 may refract into the plate 102 via the front surface 102L and then reflect from the back surface 102R and refract out of the front surface 102L resulting in a portion of unwanted light impinging on the output light collector 104, and interfering with testing. Unwanted reflections can also be generated, for example, from the fluid 112 in the hollow 1111 and the bulk 1100B on the right/back side of the MPL test cylinder 1100. Methods of reducing or eliminating reflections from the back surface 102 include configuring a non-reflecting material in the hollow 1111. Alternatively, or in addition, the back surface 102R can be roughed. Alternatively, or in addition, the back surface 102R can be slanted non-parallel to the front surface 102L.

A feature of the current embodiment is that the circular MPL cylinder 1100 can be filled at least partially with a bulk material 1100B. Correspondingly, a portion of the interior of the MPL cylinder 1100 forms the MPL receptacle 1110 (that includes the MPL hollow 1111), in this case, the portion (the MPL hollow 1111) being less than an entirety of the interior of the MPL cylinder 1100. In an exemplary implementation, the bulk 1100B is typically the same solid material as the MPL cylinder 1100, optically transparent to the light beam 420. The MPL cylinder may be constructed at the same time as the bulk, as a single piece of the same material, thus simplifying construction as compared to other implementations. Using a bulk 1100B material interior to the cylinder reduces the amount of fluid 112 required to fill the receptacle 1110, thus reducing problems with relatively larger amounts of fluids in conventional bath implementations.

In a basic MPL cylinder 1100, such as shown in FIG. 13, the cylinder has circular symmetry, with material only around the circumference, with a circular interior chamber creating the MPL receptacle 1110 and the MPL hollow 1111 in the interior of the MPL cylinder 1100. However, this configuration is not limiting. In the current figure, the material creating the circumference of the MPL cylinder 1100 also partially fills the right side, substantially almost entirely filling the right-side half of the circular interior, and forming the bulk 1100B portion. The bulk 1100B typically fills substantially half of the interior of the MPL cylinder 1100 (receptacle 1110). The bulk is substantially semicircular, and the corresponding receptacle 1110 (hollow 1111) is substantially semicircular. In a typical transmittance test, such as shown in FIG. 14A, substantially half of the path of a light beam traverses the bulk material 1100B. In a typical reflectance test, such as shown in FIG. 14B, the majority path of the light beam will be through the fluid 112. In a typical reflectance test, such as shown in FIG. 14C, the majority path of the light beam will be through the bulk 1100B, which allows the majority of the path to be through a solid material, and avoid known problems with test light propagating via a fluid. As is known in the art, the fluid 112 surrounding the optical element to be tested (plate 102) can affect the measurement accuracy due to fluid dynamics. In particular, the larger the amount of fluid, the more difficulties with measurement accuracy. Hence, a desire to reduce the amount of fluid 112 used in the apparatus. Including a bulk 1100B portion with the MPL cylinder 1100 reduces the amount of fluid 112 required to fill the MPL receptacle 1110, and thus reducing the amount of fluid 112 required to fill the MPL hollow 1111. Using a similar concept of filling areas interior to the MPL testing apparatus 1450 to minimize the amount of fluid 112 in the MPL cylinder 1100, the MPL cylinder top portion 1404 and the MPL cylinder bottom portion 1406 (not shown in the current figure) can include solid portions at the respective bottom and top of each portion. In addition, the height of the cylinder (MPL cylinder height 1100H of the MPL cylinder 1100) can be optimized to reduce the height to a minimal height required for the desired measurements, thus reducing the size of the MPL receptacle 1110. The plate 102 can be placed in a minimal sized receptacle in the top and bottom portions, thus minimizing the amount of fluid required.

As described above, in particular with reference to the rotatable cylinder 100, the cylinder and bulk can be made of glass, or another suitable material. Alternatively, the bulk can be filled with any solid object that will have no reflection to the same direction of the coating, for example, opaque, very diffusive, or deflecting in different directions.

The MPL cylinder 1100 and the fluid 112 can have the same refractive indices. Alternatively, the MPL cylinder 1100 and the fluid 112 can have different refractive indices. For example, the MPL cylinder 1100 can have a first refractive index and the fluid 112 and the plate can have a same second refractive index. Thus, a single apparatus can operate with a variety of plates 102.

Typically, the outside surface 1100U of the MPL cylinder 1100 is polished to facilitate the input test light beam 420A normal input 420B to the cylinder. The inside surface 1100N of the MPL cylinder 1100 can be polished or unpolished. The precision (for example of the outside surface 1100U smoothness), size, and shape of the MPL cylinder 1100 can be determined by the required precision of measurement of the coating on the plate 102.

Figure 15:
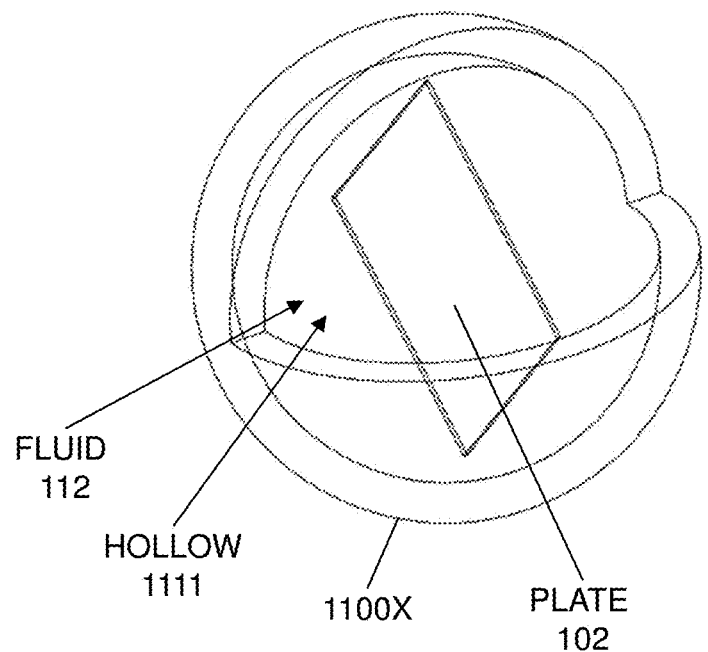
FIG. 15 is a sketch of an alternative embodiment of the MPL cylinder.

Referring now to FIG. 15, is a sketch of an alternative embodiment of the MPL cylinder. The vertical cross section of the MPL testing apparatus 1450 may be round, as shown in the previous figures (test MPL cylinder 1100), or can be an alternative shape such as a full or sliced part of a hollow ball 1100X, as shown in the current figure. Alternatively, the shape can be a wedge not shown).

Embodiments can include the above-described testing apparatus (jig) 400, and the MPL testing apparatus 1450, mounted in a Universal Measurement Accessory (UMA). In these cases, the UMA typically provides the input test light source 4. The UMA also provides a rotating mount holding the apparatus and rotating the apparatus, and thus rotating the optical sample. For example, the turntable implemented by the motor 408A, to which the bottom portion 406 motor attachment area 408B or the positioning items 1107 are connected, thus rotating the apparatus (400, 1450). Typically, the rotating is around the center of the sample, in particular around a height-axis of the apparatus. The UMA also typically provides a detector, for example the output light collector 104. The detector can be implemented on a leverage (arm) that rotates around the optical sample, substantially with the same axis of rotation as the axis of rotation of the apparatus.

Using this UMA configuration, the reflected light (input test light) can be aimed (deflected) to the detector for a range of angles by changing the angular rotation of the apparatus (400, 1450) and the detector. In general, the testing apparatus (400, 1450) and the output light collector 104 are configured as two elements with a substantially common axis, each rotating around the common axis, the apparatus configured on the axis and the collector rotating around the apparatus.

Refer again to FIG. 6A, the flowchart for a method for optical sample characterization, described above regarding the testing apparatus 400, can be applied to the MPL testing apparatus 1450.

The method of testing 610 starts in step 600 with the light beam 1420 provided normal to the MPL cylinder 1100.

In step 601, optional configurations are used, as described above.

In step 602, the output light is collected after traversing the MPL cylinder 1100, the receptacle 1110, and being reflected from the plate 102, as described above.

In step 604, the plate 102 is rotated, as described above. After rotating the plate, output light can again be collected (step 602) at the new, known angle. This cycle of rotating and collecting can be repeated as necessary to gather data on the desired range of angles to be tested (step 604 returns to step 602).

In step 606, optional calculations (processing, signal processing) can be performed on the collected signals, the data from the collected output light 602 can be processed to calculate results of the optical testing to determine a figure of merit for transmittance and/or reflectance of the coating and/or plate 102 of the optical sample under test.

In step 608, optionally the results of the collection and processing can be output, displayed, stored, and/or transferred.

Note that the above-described examples, numbers used, and exemplary calculations are to assist in the description of this embodiment. Inadvertent typographical errors, mathematical errors, and/or the use of simplified calculations do not detract from the utility and basic advantages of the invention.

To the extent that the appended claims have been drafted without multiple dependencies, this has been done only to accommodate formal requirements in jurisdictions that do not allow such multiple dependencies. Note that all possible combinations of features that would be implied by rendering the claims multiply dependent are explicitly envisaged and should be considered part of the invention.

It will be appreciated that the above descriptions are intended only to serve as examples, and that many other embodiments are possible within the scope of the present invention as defined in the appended claims.

What is claimed is:

1. An apparatus for optical testing of a sample of optical material, the apparatus comprising:
   (a) an assembly comprising:
      (i) an optically transparent general-cylinder having an interior partially filled with a bulk material portion from an interior surface of said general-cylinder toward a center axis of said general-cylinder, and said interior having a hollow portion extending from an opposite interior surface of said general cylinder and including said axis, said hollow portion sized to receive at least a core area of the sample of optical material,
      (ii) a receptacle including said hollow portion, said receptacle sized to receive at least a portion of the sample of optical material, and said receptacle sealed for receiving a quantity of fluid, such that said fluid surrounds and is in contact with at least said core area, and is in contact with said general-cylinder and at least a portion of said bulk material portion, and
   (b) an optical arrangement:
      (i) aligned with said axis,
      (ii) including an optical source providing an optical light beam normal to a surface area at a first side of said general-cylinder, and
      (iii) including an optical detector accepting an output signal, said output signal from said optical light beam impinging on said core area and reflected from the sample, said optical detector normal to a surface area of said general-cylinder.

2. The apparatus of claim 1 wherein said assembly is a rotatable assembly, and further comprising:
   (c) a turntable aligned with said axis and operable to rotate said rotatable assembly around a height-axis of said general-cylinder.

3. The apparatus of claim 1 wherein said bulk material portion fills substantially a semicircular half of said receptacle.

4. The apparatus of claim 1, wherein said general-cylinder is formed from an optically transparent material, and wherein said bulk material portion is a same optically transparent material as the optically transparent material of the general-cylinder.

5. The apparatus of claim 1 further comprising:
   a mounting arrangement for receiving said optical arrangement, said mounting arrangement adjustable for aligning said optical source and said optical detector.

6. The apparatus of claim 1 further comprising a clamping mechanism securing location of the sample with respect to said receptacle.

7. The apparatus of claim 2 further comprising
   a motor operationally connected to said rotatable assembly and operable to rotate said rotatable assembly, and
   an encoder operationally connected to said rotatable assembly and operable to provide position information at least regarding angle of rotation of said rotatable assembly.

8. The apparatus of claim 1, wherein indexes of refraction of said general-cylinder, the sample, and said fluid are substantially equal.

9. The apparatus of claim 1, wherein said fluid is an index matching fluid, and indexes of refraction of the sample and said fluid are substantially equal.

10. The apparatus of claim 1, wherein said general-cylinder and the sample of an optical material are made of the same optically transparent, solid material.

11. The apparatus of claim 1, wherein said core area of the sample is a location of the sample where a light beam encounters the sample and testing of the sample is performed.

12. The apparatus of claim 1, wherein:
(a) said receptacle has:
  (i) a receptacle-width in a direction along a cylinder diameter of said general-cylinder, said receptacle-width being smaller than said cylinder diameter, and
  (ii) a receptacle-thickness non-parallel to said receptacle-width, said receptacle-thickness between a first side and second side of said general-cylinder, and
(b) the sample has:
  (i) a plate-width in a direction along said cylinder diameter, said receptacle width being greater than said plate-width, and
  (ii) a plate-thickness non-parallel to said plate-width, said receptacle-thickness being greater than said plate-thickness.

13. The apparatus of claim 12 wherein said receptacle-width and said plate-width are aligned substantially parallel.

14. The apparatus of claim 1, wherein said sample of optical material is coated with a coating, said coating used to manipulate light incident to the sample.

15. The apparatus of claim 1, wherein said optical arrangement includes:
collimating optics preparing said optical light beam and inputting said optical light beam into said general-cylinder, said collimating optics adjustable with at least two degrees of freedom.

16. The apparatus of claim 1 wherein an optical path of said optical light beam is through said general-cylinder and said fluid, and a majority of said optical path is through said general-cylinder.

17. A controller operationally connected to the apparatus of claim 2, said controller configured to:
(a) initiate inputting an optical light beam normal to a surface area of a first side of said general-cylinder;
(b) position said general-cylinder so a light beam path traverses via a first side of said general-cylinder until reaching said hollow portion, then traverses from said first side into said fluid in said hollow portion on a first side of the sample, through the sample, through said fluid on an other side of the sample, into a second side of said general-cylinder, traverses the second side and exits normal to a surface area of the second side of the general-cylinder as an output signal; and
(c) activate capturing said output signal by said optical detector.

18. The controller of claim 17, said controller further configured to:
(a) after positioning said general-cylinder at a first angle of the sample relative to said light beam path,
(b) rotate said general-cylinder such that the sample is at a second angle relative to said light beam path, and
(c) repeat said capturing and said rotating.

19. A method for optical testing of a sample of optical material, the method comprising the steps of:
(a) providing the apparatus of claim 2;
(b) inputting an optical light beam normal to a surface area of a first side of said general-cylinder;
(c) positioning said general-cylinder so a light beam path traverses via a first side of said general-cylinder until reaching said hollow_portion, then traverses from said first side into said fluid in said hollow portion on a first side of the sample, through the sample, through said fluid on an other side of the sample, into a second side of said general-cylinder, traverses the second side and exits normal to a surface area of the second side of the general-cylinder as an output signal; and
(d) capturing said output signal by said optical detector.

20. The method of claim 19 further comprising the steps of:
(a) after said positioning at a first angle of the sample relative to said light beam path,
(b) rotating said general-cylinder such that the sample is at a second angle relative to said light beam path, and
(c) repeating said capturing and said rotating.

* * * * *